(12) United States Patent
Sugimura et al.

(10) Patent No.: US 11,938,783 B2
(45) Date of Patent: Mar. 26, 2024

(54) REFRIGERATION CYCLE DEVICE

(71) Applicant: DENSO CORPORATION, Kariya (JP)

(72) Inventors: Kengo Sugimura, Kariya (JP); Satoshi Ito, Kariya (JP); Satoshi Suzuki, Kariya (JP); Kosuke Shiratori, Kariya (JP)

(73) Assignee: DENSO CORPORATION, Kariya (JP)

( * ) Notice: Subject to any disclaimer, the term of this patent is extended or adjusted under 35 U.S.C. 154(b) by 443 days.

(21) Appl. No.: 17/380,774

(22) Filed: Jul. 20, 2021

(65) Prior Publication Data

US 2021/0347224 A1 Nov. 11, 2021

Related U.S. Application Data

(63) Continuation of application No. PCT/JP2020/001336, filed on Jan. 16, 2020.

(30) Foreign Application Priority Data

Feb. 11, 2019 (JP) .................................. 2019-022196

(51) Int. Cl.
*F25B 41/20* (2021.01)
*B60H 1/00* (2006.01)
(Continued)

(52) U.S. Cl.
CPC ..... *B60H 1/00278* (2013.01); *B60H 1/00878* (2013.01); *B60H 1/323* (2013.01);
(Continued)

(58) Field of Classification Search
CPC ............ B60H 1/00278; B60H 1/00878; B60H 1/323; B60H 2001/00307;
(Continued)

(56) References Cited

U.S. PATENT DOCUMENTS 5,291,941 A 3/1994 Enomoto et al.
2012/0085512 A1 4/2012 Graaf et al.
(Continued)

FOREIGN PATENT DOCUMENTS

JP H5223357 A 8/1993
JP H1123081 A 1/1999
(Continued)

OTHER PUBLICATIONS

Ito, Refrigeration Cycle Device, 2017, Full Document (Year: 2017).*

*Primary Examiner* — Nael N Babaa
(74) *Attorney, Agent, or Firm* — Harness, Dickey & Pierce, P.L.C.

(57) ABSTRACT

A refrigeration cycle device including a first pressure reducing valve, a first evaporator that exchanges heat between the refrigerant decompressed in the first pressure reducing valve and air, a second pressure reducing valve that is disposed in parallel with the first pressure reducing valve; a second evaporator in which the refrigerant decompressed in the second pressure reducing valve to absorbs heat from a battery; a third pressure reducing valve that reduces the pressure of the refrigerant evaporated in the second evaporator; and a controller configured to control opening degrees of the second pressure reducing valve and the third pressure reducing valve. The controller performs a limit control for controlling the opening degree of the second pressure reducing valve to an opening degree of smaller one of a battery cooling opening degree and an air cooling opening degree.

10 Claims, 7 Drawing Sheets

(51) Int. Cl.
   *B60H 1/32*    (2006.01)
   *B60L 58/26*   (2019.01)
   *F25B 25/00*   (2006.01)
   *F25B 49/02*   (2006.01)

(52) U.S. Cl.
   CPC ............ *B60L 58/26* (2019.02); *F25B 25/005* (2013.01); *F25B 41/20* (2021.01); *F25B 49/02* (2013.01); *B60H 2001/00307* (2013.01); *B60H 2001/00928* (2013.01)

(58) Field of Classification Search
   CPC ........... B60H 2001/00928; B60L 58/26; F25B 41/20; F25B 25/005; F25B 49/02
   See application file for complete search history.

(56) References Cited

U.S. PATENT DOCUMENTS

| | | | |
|---|---|---|---|
| 2012/0125032 A1 | 5/2012 | Graaf et al. | |
| 2015/0013367 A1* | 1/2015 | Carpenter | ............... F25B 49/02 62/222 |
| 2017/0313158 A1 | 11/2017 | Porras et al. | |

FOREIGN PATENT DOCUMENTS

| | | | |
|---|---|---|---|
| JP | 5403766 B2 | 1/2014 | |
| JP | 5643179 B2 | 12/2014 | |
| JP | 2018185104 A | * | 11/2018 |
| JP | 2019209938 A | 12/2019 | |
| WO | WO-2018198611 A1 | 11/2018 | |

* cited by examiner

REFRIGERATION CYCLE DEVICE

CROSS REFERENCE TO RELATED APPLICATION

The present application is a continuation application of International Patent Application No. PCT/JP2020/001336 filed on Jan. 16, 2020, which designated the U.S. and claims the benefit of priority from Japanese Patent Application No. 2019-022196 filed on Feb. 11, 2019. The entire disclosures of all of the above applications are incorporated herein by reference.

TECHNICAL FIELD

The present disclosure relates to a refrigeration cycle device for cooling air and a battery.

BACKGROUND

In a refrigeration cycle device, a refrigerant of a refrigerant cycle flows in parallel to each other in an air cooler and a battery cooler.

For example, a flow of the refrigerant cooled and condensed in a condenser of the refrigerant cycle is branched in two streams. One of the branched refrigerants is reduced in pressure by an expansion mechanism and then flows into the air cooler to absorb heat from the air and evaporate. The other branched refrigerant is reduced in pressure by an expansion mechanism, flows into the battery cooler to absorb heat from the battery and evaporate.

SUMMARY

According to an aspect of the present disclosure, a refrigeration cycle device includes: a compressor configured to draw and discharge a refrigerant; a radiator configured to dissipate heat from the refrigerant discharged from the compressor; a first pressure reducing valve configured to reduce a pressure of the refrigerant flowing from the radiator; a first evaporator configured to exchange heat between the refrigerant decompressed in the first pressure reducing valve and air, and to evaporate the refrigerant; a second pressure reducing valve disposed in parallel with the first pressure reducing valve in a flow of the refrigerant and configured to reduce the pressure of the refrigerant flowing from the radiator; a second evaporator configured to evaporate the refrigerant pressure-reduced in the second pressure reducing valve, by absorbing heat from a battery; a third pressure reducing valve configured to reduce the pressure of the refrigerant evaporated in the second evaporator; and a controller configured to control opening degrees of the second pressure reducing valve and the third pressure reducing valve.

The controller may be configured to perform a limit control in which an opening degree of the second pressure reducing valve or the third pressure reducing valve is set at a smaller one of a battery cooling opening degree and an air cooling opening degree. The battery cooling opening degree is an opening degree for setting a battery cooling capacity of the second evaporator to a target battery cooling capacity, and the air cooling opening degree is an opening degree for setting an air cooling capacity of the first evaporator to a target air cooling capacity.

BRIEF DESCRIPTION OF DRAWINGS

The objects, features and advantages of the present disclosure will become more apparent from the following detailed description made with reference to the accompanying drawings.

DESCRIPTION OF EMBODIMENTS

Figure 1:
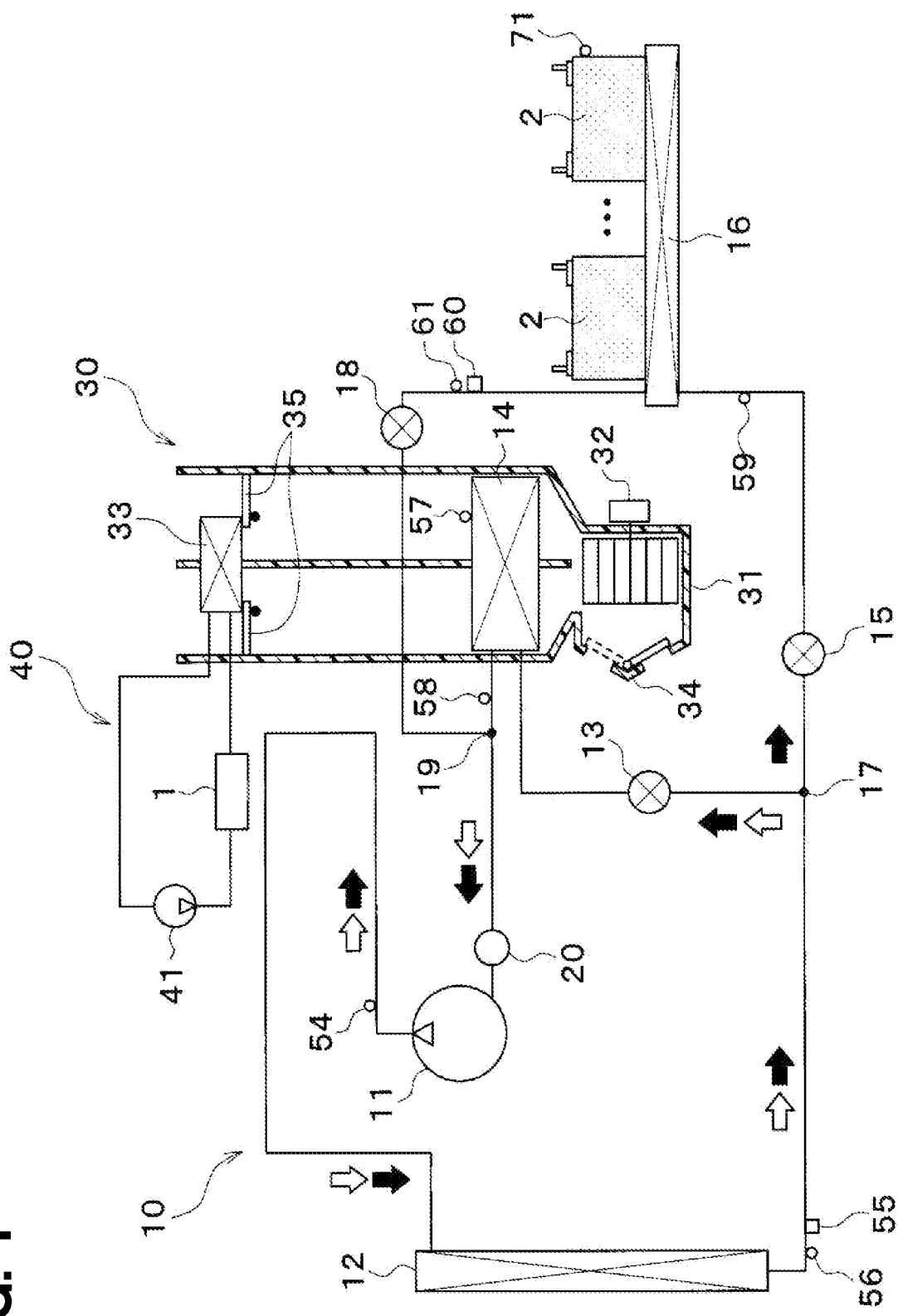
FIG. 1 is an overall configuration diagram showing a refrigeration cycle device in a first embodiment.

If a refrigerant of a refrigeration cycle flows in parallel in an air cooler and a battery cooler, it may be difficult to achieve both air cooling and battery cooling in some conditions. For example, if the refrigerant cycle is controlled to surely secure an air cooling capacity, a refrigerant flow rate of the battery cooler may be insufficient and a battery cooling capacity may be insufficient.

If the refrigerant flow rate of the battery cooler is reduced as a countermeasure against the shortage of the refrigerant flow rate on the air conditioning side, dry-out may occur in the battery cooler, and a battery temperature variation easily occurs. The dry-out means that a region, in which only a gas-phase refrigerant exists due to excessive evaporation of the refrigerant, occurs.

If a refrigerant discharge flow rate from the compressor is increased as a countermeasure for restricting the temperature variation of the battery and securing the air cooling capacity, power consumption of the compressor increases.

In view of the above, an object of the present disclosure is to achieve both air cooling and battery cooling while restricting an increase in power consumption.

According to an exemplar of the present disclosure, a refrigeration cycle device includes: a compressor configured to draw and discharge a refrigerant; a radiator configured to dissipate heat from the refrigerant discharged from the compressor; a first pressure reducing valve configured to reduce a pressure of the refrigerant flowing from the radiator; a first evaporator configured to exchange heat between the refrigerant decompressed in the first pressure reducing valve and air, and to evaporate the refrigerant; a second pressure reducing valve disposed in parallel with the first pressure reducing valve in a flow of the refrigerant and configured to reduce the pressure of the refrigerant flowing from the radiator; a second evaporator configured to evaporate the refrigerant pressure-reduced in the second pressure reducing valve, by absorbing heat from a battery; a third pressure reducing valve configured to reduce the pressure of the refrigerant evaporated in the second evaporator; and a controller configured to control opening degrees of the second pressure reducing valve and the third pressure reducing valve.

The controller is configured to perform a limit control in which an opening degree of the second pressure reducing valve or the third pressure reducing valve is set at a smaller one of a battery cooling opening degree and an air cooling opening degree. The battery cooling opening degree is an opening degree for setting a battery cooling capacity of the second evaporator to a target battery cooling capacity, and the air cooling opening degree is an opening degree for setting an air cooling capacity of the first evaporator to a target air cooling capacity.

Because the pressure of the refrigerant flowing into the second evaporator is lowered by reducing the opening degree of the second pressure reducing valve or the third pressure reducing valve, the temperature of the second evaporator can be lowered.

On the other hand, the refrigerant flow rate flowing into the second evaporator is decreased by reducing the opening degree of the second pressure reducing valve or the third pressure reducing valve. Therefore, the refrigerant flow rate flowing into the first evaporator can be relatively increased.

The opening degree of the second pressure reducing valve or the third pressure reducing valve is controlled to the smaller one of the battery cooling opening degree and the air cooling opening degree. Therefore, the refrigerant flow rate flowing into the first evaporator can be restricted from being insufficient while restricting the temperature rise of the second evaporator.

As a result, it is possible to achieve both air cooling and battery cooling while restricting an increase in power consumption.

The first pressure reducing valve, the second pressure reducing valve and the third pressure reducing valve are examples of pressure reducing devices, and may be suitably modified without being limited to valves. A general pressure reducing device having an opening degree control can be used as the first pressure reducing valve, the second pressure reducing valve and the third pressure reducing valve.

The controller controls, in the limit control, the opening degree of the second pressure reducing valve to the smaller one of the battery cooling opening degree and the air cooling opening degree, and controls the opening degree of the third pressure reducing valve so that the degree of superheat of the refrigerant that has flowed from the second evaporator is the target degree of superheat. Thus, the occurrence of dry-out in the second evaporator can be restricted. As a result, it is possible to achieve both air cooling and battery cooling, and to effectively restrict battery temperature variation while restricting an increase in power consumption.

In the limit control, the controller may control the opening degree of the second pressure reducing valve to the smaller one of the air cooling opening degree and the battery cooling opening degree, and controls the opening degree of the third pressure reducing valve such that a degree of superheat of the refrigerant on an outlet side of the second evaporator approaches a target degree of superheat.

In at least one of embodiments of the present disclosure, the controller may be configured to control the opening degree of the second pressure reducing valve or the third pressure reducing valve at an opening degree for setting the battery cooling capacity of the second evaporator to the target battery cooling capacity when determining that cooling of the battery in the second evaporator does not influence cooling of the air in the first evaporator, and to perform the limit control when determining that the cooling of the battery in the second evaporator influences the cooling of the air in the first evaporator.

The controller may be configured in the limit control, to set the air cooling opening degree to an opening degree for setting a temperature of the first evaporator to a target first evaporator temperature, and to set the battery cooling opening degree to an opening degree for setting a temperature of the second evaporator to a target second evaporator temperature. In addition, the controller may be configured in the limit control, to determine the target second evaporator temperature to be lower than a temperature of the battery by a predetermined temperature difference, and to increase the predetermined temperature difference as a heat generation amount of the battery increases.

In the limit control, the controller may increase an amount of reduction in the battery cooling opening degree as a temperature of the battery increases.

In the refrigeration cycle device, the second evaporator may be disposed in contact with the battery to be thermally conductive.

Hereinafter, multiple embodiments for performing the present disclosure will be described with reference to the drawings. In each embodiment, portions corresponding to those described in the preceding embodiment are denoted by the same reference numerals, and overlapping descriptions may be omitted. In a case where only a part of a configuration is described in each embodiment, the other embodiments described above are capable of being applied for the other parts of the configuration. Not only a combination of parts that clearly indicate that the combination is possible in each embodiment, but also a partial combination of embodiments even if the combination is not specified is also possible when there is no problem in the combination.

First Embodiment

A first embodiment will be described below with reference to the drawings. A refrigeration cycle device 10 for a vehicle shown in FIG. 1 is applied to a hybrid vehicle in which a traveling driving force is obtained from an engine 1 (in other words, an internal combustion engine) and a traveling electric motor.

The hybrid vehicle is configured as a so-called plug-in hybrid vehicle. Therefore, the hybrid vehicle is configured to be capable of charging a battery 2 mounted on the vehicle with electric power supplied from an external power supply (for example, a commercial power supply) when the vehicle stops. As the battery, for example, a lithium ion battery can be used.

In the hybrid vehicle, the driving force output from the engine 1 is used not only for vehicle traveling but also for operating a generator. In the hybrid vehicle, electric power generated by a generator and electric power supplied from an external power supply can be stored in the battery 2, and the electric power stored in the battery 2 is supplied not only to the traveling electric motor but also to various in-vehicle devices mounted on the hybrid vehicle.

The hybrid vehicle travels in an EV travel mode when a remaining amount of electricity stored in the battery 2 is equal to or more than a predetermined traveling reference remaining amount as when the travel initiates. The EV travel mode means a travel mode in which the vehicle is traveled by driving the traveling electric motor by the electric power of the battery 2.

The hybrid vehicle travels in the HV travel mode when the remaining amount of electricity stored in the battery 2 is lower than the traveling reference remaining amount while the vehicle is traveling. The HV travel mode is a travel mode in which the vehicle is traveling mainly by the driving force output from the engine 1, but when a vehicle running load is a high load, the traveling electric motor is operated to assist the engine 1.

By switching between the EV travel mode and the HV travel mode in this manner, the hybrid vehicle restricts a fuel consumption amount of the engine 1 as compared with a normal vehicle in which the vehicle traveling driving force is obtained only from the engine 1, thereby improving a vehicle fuel efficiency.

Figure 2:
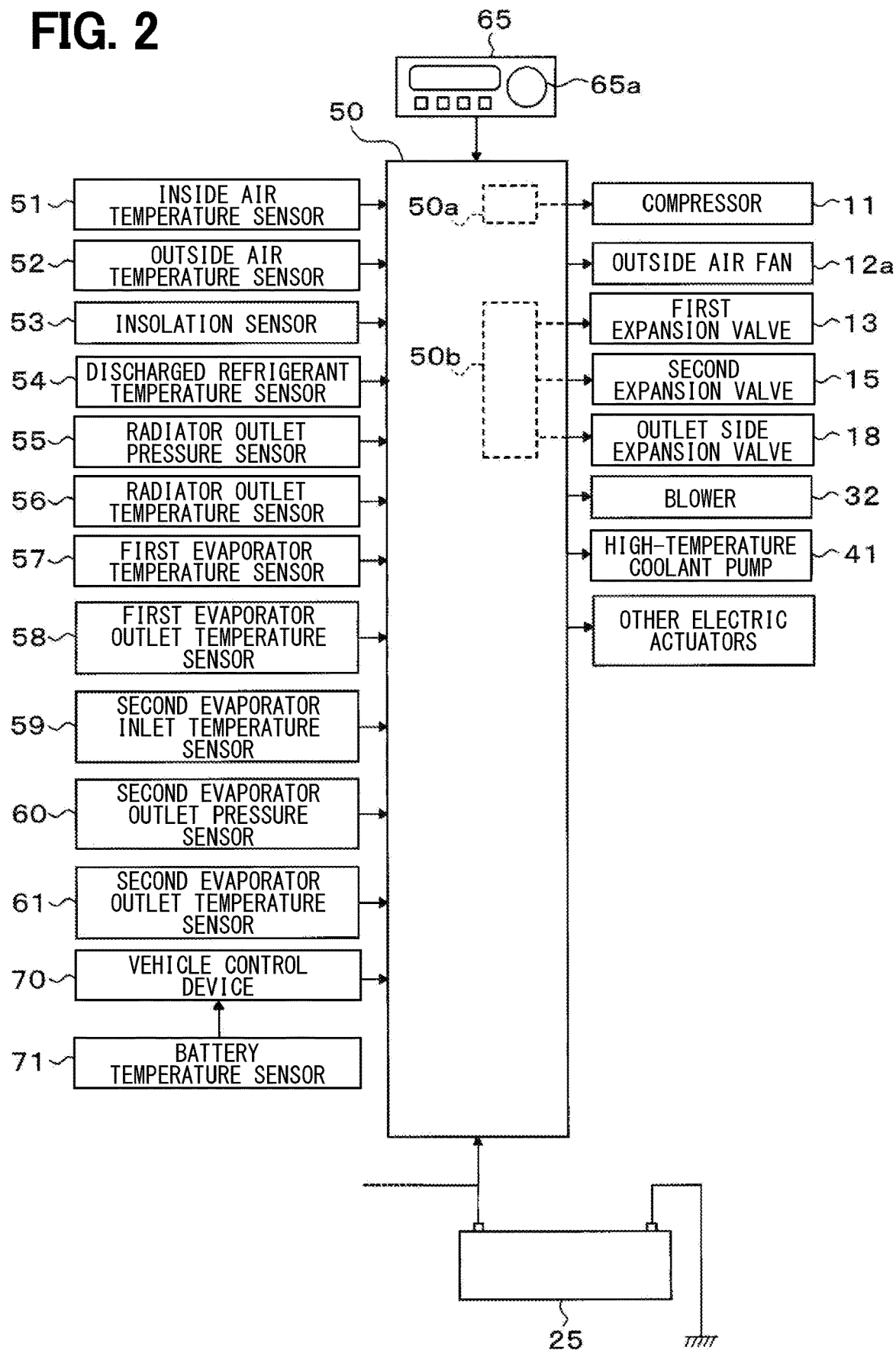
FIG. 2 is a block diagram showing an electric control unit of the refrigeration cycle device in the first embodiment.

In the hybrid vehicle, switching between the EV travel mode and the HV travel mode is controlled by a vehicle control device 70 shown in FIG. 2. The engine 1 is a power unit in the hybrid vehicle.

A vehicle refrigeration cycle device 10 cools air blown out into a vehicle interior in order to cool or dehumidify the vehicle interior of the vehicle. That is, the vehicle refrigeration cycle device 10 is also a vehicle air cooling device.

It is desirable that the secondary battery such as the battery 2 be used in an appropriate temperature range in order to fully utilize a charging and discharging capacity without promoting deterioration. Therefore, the vehicle refrigeration cycle device 10 cools the battery 2 so as to maintain the temperature of the battery 2 within an appropriate temperature band. That is, the vehicle refrigeration cycle device 10 is also a vehicle battery cooling device.

The refrigeration cycle device 10 cools the air and the battery 2 that are blown into the vehicle interior by the vapor compression type refrigeration cycle.

In order to perform air cooling and battery cooling, the refrigeration cycle device 10 is configured to be capable of switching refrigerant circuits of an air cooling alone operation, an air-battery cooling operation, and a battery cooling alone operation.

In the air cooling alone operation, air cooling is performed, and battery cooling is not performed. In the air-battery cooling operation, both air cooling and battery cooling are performed. In the battery cooling alone operation, air cooling is not performed, and battery cooling is performed.

In FIG. 1, a flow of the refrigerant in the refrigerant circuit of the air cooling alone operation is indicated by a white arrow. A flow of the refrigerant in the refrigerant circuit of the air-battery cooling operation is indicated by a black arrow.

In the refrigeration cycle device 10, an HFC-based refrigerant (specifically, R1234yf) is employed as the refrigerant, and constitutes a vapor compression type subcritical refrigeration cycle in which a pressure of a discharged refrigerant which is discharged from a compressor 11 does not exceed a critical pressure of the refrigerant. A refrigerator oil for lubricating the compressor 11 is mixed in the refrigerant, and a part of the refrigerator oil circulates in a cycle together with the refrigerant.

The refrigeration cycle device 10 includes the compressor 11, a radiator 12, a first expansion valve 13, a first evaporator 14, a second expansion valve 15, a second evaporator 16, and an outlet side expansion valve 18.

The compressor 11 draws the refrigerant in the refrigeration cycle device 10, compresses, and discharges the refrigerant. The compressor 11 is configured of an electric compressor in which a fixed capacity type compression mechanism having a fixed discharge capacity is rotationally driven by an electric motor.

The refrigerant discharge capacity (that is, rotation speed) of the compressor 11 is controlled by a control signal output from a controller 50. The compressor 11 is disposed in a vehicle engine hood.

A refrigerant inlet side of the radiator 12 is connected to a discharge port of the compressor 11. The radiator 12 is an exterior heat exchanger that exchanges heat between the high-pressure refrigerant discharged from the compressor 11 and a vehicle exterior air (hereinafter, referred to as outside air) blown by an outside air fan 12a shown in FIG. 2, to condense a high-pressure refrigerant. The radiator 12 is disposed on a front side in the vehicle engine hood.

The outside air fan 12a is configured of an electric blower. A blowing capacity (that is, rotation speed) of the outside air fan 12a is controlled by a control voltage output from the controller 50.

An inflow port side of a first three-way joint 17 is connected to the refrigerant outlet side of the radiator 12. The first three-way joint 17 has three inflow and outflow ports communicating with each other. For example, the first three-way joint 17 is formed by joining multiple pipes. The first three-way joint 17 may be formed by providing multiple refrigerant passages in a metal block or a resin block.

An inlet side of the first expansion valve 13 is connected to one outflow port of the first three-way joint 17. The inlet side of the second expansion valve 15 is connected to the other outflow port of the first three-way joint 17.

The first expansion valve 13 and the second expansion valve 15 reduce the pressure of the high-pressure refrigerant that has flowed from the radiator 12. The first expansion valve 13 is an electric variable throttle mechanism including a valve body configured to be able to change a throttle opening degree and an electric actuator for changing the opening degree of the valve body. The first expansion valve 13 adjusts an opening area of the flow channel through which the refrigerant flows to adjust the pressure reduction amount of the refrigerant. A basic configuration of the second expansion valve 15 is the same as that of the first expansion valve 13.

The first expansion valve 13 is a first pressure reducing valve for reducing the pressure of the high-pressure refrigerant flowing into the first evaporator 14. The second expansion valve 15 is a battery cooling pressure reducing portion for reducing the pressure of the high-pressure refrigerant flowing into the second evaporator 16. The second expansion valve 15 is a second pressure reducing valve disposed on the refrigerant inlet side of the second evaporator 16.

The first expansion valve 13 and the second expansion valve 15 have a full opening function which functions as a simple refrigerant passage by fully opening the valve opening degree without exhibiting almost a flow rate adjusting action and a refrigerant pressure reducing action, and a full closing function which functions of closing the refrigerant passage by fully closing the valve opening degree.

By the full opening function and the full closing function, the first expansion valve 13 and the second expansion valve 15 can switch the refrigerant circuit of each of the above-described operations. Therefore, the first expansion valve 13 and the second expansion valve 15 also have a function as a refrigerant circuit switching device. The first expansion valve 13 and the second expansion valve 15 are controlled by a control signal (for example, a control pulse) output from the controller 50.

The refrigerant inlet side of the first evaporator 14 is connected to the outlet side of the first expansion valve 13. The first evaporator 14 is disposed in an air conditioning case 31 of an interior air conditioning unit 30.

The first evaporator 14 is an air cooler that exchanges heat between the low-pressure refrigerant reduced in pressure by the first expansion valve 13 and the air blown from the blower 32 to evaporate the low-pressure refrigerant, and exerts a heat absorbing action in the low-pressure refrigerant to cool the air.

One inflow port side of a second three-way joint 19 is connected to the outlet side of the first evaporator 14. A basic configuration of the second three-way joint 19 is the same as that of the first three-way joint 17. The refrigerant inlet side of the accumulator 20 is connected to the outflow port of the second three-way joint 19. An intake port side of the compressor 11 is connected to a refrigerant outlet side of the accumulator 20.

The refrigerant inlet side of the second evaporator 16 is connected to the outlet side of the second expansion valve 15. The second evaporator 16 is disposed in contact with the battery 2 in a heat conductive manner. The second evaporator 16 is a battery cooling heat exchanger for cooling the battery 2 by evaporating the refrigerant flowing through the inside thereof to exert the heat absorbing action.

The outlet side expansion valve 18 is disposed on the outlet side of the second evaporator 16. The outlet side expansion valve 18 is a third pressure reducing valve disposed on the refrigerant outlet side of the second evaporator 16.

A basic configuration of the outlet side expansion valve 18 is the same as that of the first expansion valve 13. The outlet side expansion valve 18 has the full opening function which functions as a simple refrigerant passage without exhibiting almost the flow rate adjusting action and the refrigerant pressure reducing action by fully opening the valve opening degree. The outlet side expansion valve 18 is controlled by a control signal (for example, a control pulse) output from the controller 50.

The other inflow port side of the second three-way joint 19 is connected to the outlet side of the outlet side expansion valve 18. The second three-way joint 19 merges the flow of the refrigerant that has flowed from the outlet side expansion valve 18 with the flow of the refrigerant that has flowed from the first evaporator 14.

The accumulator 20 is a gas-liquid separator that separates gas and liquid of the refrigerant that has flowed from the first evaporator 14 and the outlet side expansion valve 18, and stores an excess liquid-phase refrigerant in the cycle.

The interior air conditioning unit 30 blows air into the vehicle interior of the vehicle. The interior air conditioning unit 30 is provided for blowing air whose temperature has been adjusted by the refrigeration cycle device 10 into the vehicle interior. The interior air conditioning unit 30 is disposed inside an instrument panel at a foremost portion of the vehicle interior.

The interior air conditioning unit 30 is configured by accommodating the blower 32, the first evaporator 14, a heater core 33, and the like in the air conditioning case 31 which forms an outer shell thereof. That is, in the interior air conditioning unit 30, the first evaporator 14, the heater core 33, and the like are disposed in an air passage formed inside the air conditioning case 31.

The air conditioning case 31 defines an air passage through which air is blown into the vehicle interior. The air conditioning case 31 is formed of a resin (for example, polypropylene) which has a certain degree of elasticity and is excellent in strength.

An inside-outside air switch device 34 is disposed on the most upstream side of the air flow in the air conditioning case 31. The inside-outside air switch device 34 switches and introduces inside air (that is, vehicle interior air) and external air (that is, vehicle exterior air) into the air conditioning case 31.

The inside-outside air switch device 34 continuously adjusts opening areas of an inside air introduction port for introducing the internal air into the air conditioning case 31 and an outside air introduction port for introducing the external air by an inside-outside air switch door, and changes an introduction ratio of the introduction air volume of the inside air and the introduction air volume of the outside air. The inside-outside air switch door is driven by an electric actuator for the inside-outside air switch door. The electric actuator is controlled by a control signal output from the controller 50.

The blower 32 is disposed on the air flow downstream side of the inside-outside air switch device 34. The blower 32 is constituted by an electric blower in which a centrifugal multi-blade fan is driven by an electric motor. The blower 32 blows the air, which is taken in through the inside-outside air switch device 34, toward the vehicle interior. The blowing capacity (that is, the rotation speed) of the blower 32 is controlled by a control voltage output from the controller 50.

On the air flow downstream side of the blower 32, the first evaporator 14 and the heater core 33 are disposed in this order in the air flow direction. The first evaporator 14 is disposed the air flow upstream side of the heater core 33.

The heater core 33 is a heating heat exchanger that exchanges heat between the coolant circulating in the high-temperature coolant circuit 40 and the air that has passed through the first evaporator 14 to heat the air.

An air mix door 35 is disposed on the air flow downstream side of the first evaporator 14 in the air conditioning case 31 and on the air flow upstream side of the heater core 33.

The air mix door 35 is an air volume ratio adjustment unit that adjusts an air volume ratio between the air that passes through the heater core 33 and the air that bypasses the heater core 33, among the air that has passed through the first evaporator 14.

The air mix door 35 is driven by an electric actuator for the air mix door. The electric actuator is controlled by a control signal output from the controller 50.

A mixing space is provided on the air flow downstream side of the heater core 33. The mixing space is a space for mixing the hot air that has passed through the heater core 33 and the cold air that has bypassed the heater core 33 and has flowed.

In an air flow downstream portion in the air conditioning case 31, an opening portion is disposed which is provided for blowing out air (that is, conditioned air) mixed in the mixing space into the vehicle interior which is the space to be air conditioned.

As the opening portions of the air conditioning case 31, a face opening portion, a foot opening portion, and a defroster opening portion (neither not shown) are provided. The face opening portion is an opening portion for blowing the air conditioning wind toward the upper body of the occupant in the vehicle interior. The foot opening portion is an opening portion for blowing the air conditioning wind toward the foot of the occupant. The defroster opening portion is an opening portion for blowing the air conditioning wind toward an inner side surface of the vehicle front window glass.

The face opening portion, the foot opening portion, and the defroster opening portion are respectively connected to a face blowing port, a foot blowing port, and a defroster blowing port (neither not shown) provided in the vehicle interior via a duct forming each air passage.

The air mix door 35 adjusts the air volume ratio between the air passing through the heater core 33 and the air bypassing the heater core 33, thereby adjusting the temperature of the air conditioning wind mixed in the mixing space. Therefore, the temperature of the air conditioning wind blown out of each of the blowing ports into the vehicle interior is adjusted.

A face door, a foot door, and a defroster door are disposed on the air flow upstream side of the face opening portion, the foot opening portion, and the defroster opening portion, respectively. The face door adjusts the opening area of the face opening portion. The foot door adjusts the opening area of the foot opening portion. The defroster door adjusts the opening area of the defroster opening portion.

The face door, the foot door, and the defroster door are blowing port mode switching devices for switching the blowing port mode. These doors are connected to an electric actuator for driving the blowing port mode door via a link mechanism or the like, and are rotationally operated in an interlocked manner. The electric actuator is controlled by a control signal output from the controller 50.

Specific examples of the blowing port mode switched by the blowing port mode switching device include a face mode, a bi-level mode, and a foot mode.

The face mode is a blowing port mode in which the face blowing port is fully opened and air is blown out of the face blowing port toward the upper body of the occupant in the vehicle interior. The bi-level mode is a blowing port mode in which both the face blowing port and the foot blowing port are opened and air is blown out toward the upper body and the foot of the occupant in the vehicle interior. The foot mode is a blowing port mode in which the foot blowing port is fully opened and the defroster blowing port is opened by a small opening degree, and air is mainly blown out of the foot blowing port.

It is also possible for the occupant to enter the defroster mode by performing a manual operation of a blowing mode switching switch provided on the operation panel 65 shown in FIG. 2. The defroster mode is a blowing port mode in which the defroster blowing port is fully opened and air is blown out of the defroster blowing port to the inner surface of the vehicle front window glass.

The high-temperature coolant circuit 40 is a heat medium circuit that circulates a heat medium between the engine 1 and the heater core 33. Coolant is used as the heat medium in the high-temperature coolant circuit 40. As the coolant, for example, water, an ethylene glycol aqueous solution, or the like can be employed.

A high-temperature coolant pump 41, the engine 1, and the heater core 33 are disposed in the high-temperature coolant circuit 40. In the high-temperature coolant circuit 40, these components are connected by a coolant flow channel. The high-temperature coolant circuit 40 constitutes a closed circuit in which the coolant can be circulated.

The high-temperature coolant pump 41 is a water pump for sucking and pumping the coolant. The coolant of the high-temperature coolant circuit 40 circulates through the engine 1, whereby the engine 1 is cooled and the coolant of the high-temperature coolant circuit 40 is heated. The heater core 33 exchanges heat between the coolant heated by the engine 1 and the air passing through the first evaporator 14 in the interior air conditioning unit 30 to heat air.

For example, in a vehicle without an engine such as an electric vehicle, a water heater may be disposed in the high-temperature coolant circuit 40 instead of the engine 1. The water heater includes, for example, a PTC element, a nichrome wire, or the like, and generates heat when electric power is supplied to heat the coolant.

Next, an electric control unit (i.e., controller) of the vehicle refrigeration cycle device 10 will be described. As shown in FIG. 2, the vehicle refrigeration cycle device 10 includes the controller 50. The controller 50 is configured of a well-known microcomputer including a CPU, a ROM, a RAM, and the like, and peripheral circuits thereof.

The controller 50 performs various calculations and processes based on a control program stored in the ROM, and controls various control target devices connected to an output side thereof. The control target device includes the compressor 11, the outside air fan 12a, the first expansion valve 13, the second expansion valve 15, the outlet side expansion valve 18, the blower 32, the high-temperature coolant pump 41, and the like.

Various air conditioning sensor groups used for operation control by the vehicle refrigeration cycle device 10 are connected to the input side of the controller 50. Detection signals of these air conditioning sensor groups are input to the controller 50.

As shown in FIG. 2, the air conditioning sensor group includes an inside air temperature sensor 51, an outside air temperature sensor 52, an insolation sensor 53, a discharged refrigerant temperature sensor 54, a radiator outlet pressure sensor 55, a radiator outlet temperature sensor 56, a first evaporator temperature sensor 57, a first evaporator outlet temperature sensor 58, a second evaporator inlet temperature sensor 59, a second evaporator outlet pressure sensor 60, a second evaporator outlet temperature sensor 61, and the like.

The inside air temperature sensor 51 is an internal air temperature detection unit that detects a vehicle interior temperature Tr (hereinafter, referred to as the inside air temperature). The outside air temperature sensor 52 is an outside air temperature detection unit that detects a vehicle exterior temperature Tam (hereinafter, referred to as the outside air temperature). The insolation sensor 53 is an insolation amount detection unit that detects the amount of insolation As irradiated into the vehicle interior.

The discharged refrigerant temperature sensor 54 is a discharge refrigerant temperature detection unit that detects the discharge temperature of the refrigerant which is discharged from the compressor 11. The radiator outlet pressure sensor 55 is a radiator outlet pressure detection unit that detects the pressure of the refrigerant that has flowed from the radiator 12. The radiator outlet temperature sensor 56 is a radiator outlet temperature detection unit that detects the temperature T3 of the refrigerant that has flowed from the radiator 12.

The first evaporator temperature sensor 57 is a first evaporator temperature detection unit that detects a refrigerant evaporation temperature TE (hereinafter, referred to as the first evaporator temperature) in the first evaporator 14. For example, the first evaporator temperature sensor 57 detects a fin temperature of the first evaporator 14.

The first evaporator outlet temperature sensor 58 is a first evaporator outlet temperature detection unit that detects the temperature of the refrigerant flowing out from the first evaporator 14.

The second evaporator inlet temperature sensor 59 is a second evaporator inlet temperature detection unit that detects a temperature Tin (hereinafter, referred to as the second evaporator temperature) of the refrigerant flowing into the second evaporator 16. The second evaporator outlet pressure sensor 60 is a second evaporator outlet pressure detection unit that detects the pressure of the refrigerant that has flowed from the second evaporator 16. The second evaporator outlet temperature sensor 61 is a second evaporator outlet temperature detection unit that detects a temperature Tout of the refrigerant that has flowed from the second evaporator 16.

An operation panel 65 is connected to the input side of the controller 50. The operation panel 65 is disposed in the vicinity of the instrument panel in the front portion of the vehicle interior, and has various operation switches. Therefore, operation signals from various operation switches are input to the controller 50.

The various operation switches in the operation panel 65 include an automatic switch, an air conditioner switch, an air volume setting switch, a blowing mode switching switch, and the like in addition to a temperature setting switch 65a.

The temperature setting switch 65a is operated when setting the target temperature Tset in the vehicle interior. The automatic switch is operated when the automatic control operation of the vehicle refrigeration cycle device 10 is set or canceled.

The air conditioner switch is operated when it is requested to cool the air blown into the vehicle interior by the vehicle refrigeration cycle device 10. The air volume setting switch is operated when manually setting the air volume of the blower 32. The blowing mode switching switch is operated when manually setting the blowing mode in the vehicle refrigeration cycle device 10.

The vehicle control device 70 is connected to the input side of the controller 50. The vehicle control device 70 performs switching control between the EV travel mode and the HV travel mode of the hybrid vehicle. A travel mode signal indicating the travel mode (that is, the HV travel mode or the EV travel mode) of the hybrid vehicle is input to the controller 50.

The vehicle control device 70 determines whether it is necessary to cool the battery 2 based on the temperature of the battery 2 detected by a battery temperature sensor 71, and outputs a determination result to the controller 50. Therefore, a signal indicating whether the battery 2 needs to be cooled is input to the controller 50.

The vehicle control device 70 also outputs the temperature of the battery 2 detected by the battery temperature sensor 71 to the controller 50. Therefore, the temperature of the battery 2 detected by the battery temperature sensor 71 is also input to the controller 50.

The controller 50 has an integrated control unit that controls various control target devices connected to the output side thereof. In of each control unit of the controller 50, a configuration (specifically, hardware and software) for controlling each of the control target devices controls each of the control target devices.

For example, the controller 50 includes a compressor control unit 50a, a throttle control unit 50b, and a three-way valve control unit 50c. The compressor control unit 50a controls the compressor 11 of the controller 50. The throttle control unit 50b controls the first expansion valve 13, the second expansion valve 15, and the outlet side expansion valve 18 of the controller 50.

Figure 3:
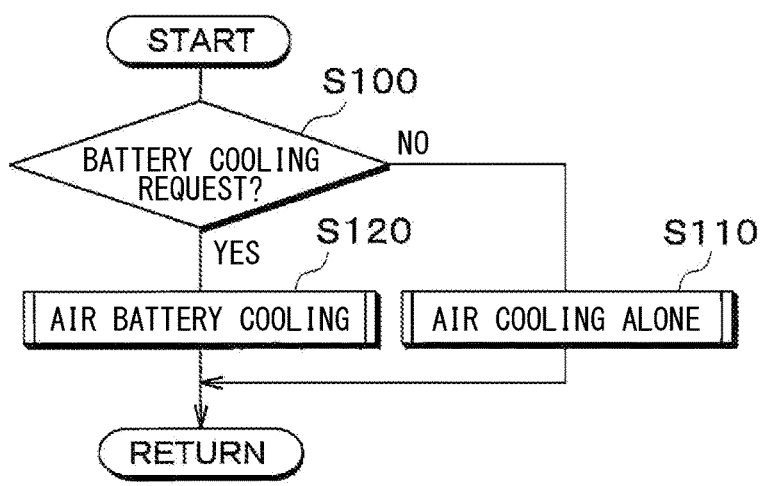
FIG. 3 is a flowchart showing a first control process executed by a controller of the refrigeration cycle device in the first embodiment.

In a case where the air conditioner switch of the operation panel 65 is turned on, the controller 50 executes a control process shown in the flowchart of FIG. 3.

In step S100, it is determined whether there is a battery cooling request from the vehicle control device 70. In a case where it is determined in step S100 that there is no battery cooling request from the vehicle control device 70, air cooling is necessary, but battery cooling is not necessary. Therefore, the process proceeds to step S110, in which the refrigeration cycle device 10 is operated to perform the air cooling alone operation.

In the control program executed by the air cooling alone operation, the detection signal of the above-mentioned control sensor group and the operation signals from various air conditioning operation switches are read. Based on values of the read detection signal and operation signals, a target blowing temperature TAO, which is a target temperature of the blown out air which is blown into the vehicle interior, is calculated based on the following Mathematical Expression F1.

$$TAO = Kset \times Tset - Kr \times Tr - Kam \times Tam - Ks \times As + C \quad (F1)$$

In Mathematical Expression F1, Tset is the target temperature (in other words, the vehicle interior setting temperature) in the vehicle interior set by the temperature setting switch 65a. Tr is the inside air temperature detected by the inside air temperature sensor 51. Tam is the outside air temperature detected by the outside air temperature sensor 52. As is an amount of insolation detected by the insolation sensor 53. Kset, Kr, Kam, and Ks are control gains. C is a correction constant.

In the air cooling alone operation, the controller 50 sets the first expansion valve 13 to a throttle state where the pressure reducing action is exerted, and sets the second expansion valve 15 to a fully closed state.

Therefore, in the refrigeration cycle device 10 of the air cooling alone operation, a vapor compression type refrigeration cycle is configured in which the refrigerant circulates in the order of the compressor 11, the radiator 12, the first expansion valve 13, the first evaporator 14, and the compressor 11, as shown by a white arrow in FIG. 1.

In this cycle configuration, the controller 50 determines the refrigerant discharge capacity (that is, the control signal output to the electric motor of the compressor 11) of the compressor 11. Specifically, the compressor 11 is controlled so that the first evaporator temperature TE is the target first evaporator temperature TEO.

The target first evaporator temperature TEO is determined based on the target blowing temperature TAO with reference to a control map stored in advance in the controller 50. In the control map, the target first evaporator temperature TEO is determined so as to decrease as the target blowing temperature TAO decreases. The target first evaporator temperature TEO is determined so as to be within a range (specifically, 1° C. or more) in which frosting of the first evaporator 14 can be restricted.

Since the vehicle refrigeration cycle device 10 includes an accumulator, and the controller 50 adjusts the throttle opening degree of the first expansion valve 13. Therefore, a degree of subcooling of the refrigerant flowing into the first expansion valve 13 is a target degree of subcooling. The target degree of subcooling is determined based on the pressure of the refrigerant that has flowed from the radiator 12 and the temperature of the refrigerant that has flowed from the radiator 12 with reference to a control map stored in advance in the controller 50. In the control map, the target degree of subcooling is determined so that the coefficient of performance COP of the cycle approaches a maximum value.

In this manner, in the air cooling alone operation, the heat absorbed from the air, when the refrigerant evaporates in the first evaporator 14, is dissipated to the outside air by the radiator 12. Therefore, the air can be cooled by the first evaporator 14.

On the other hand, in a case where it is determined in step S100 that there is a battery cooling request from the vehicle control device 70, since both air cooling and battery cooling are necessary, the process proceeds to step S110, and it is determined that the air-battery cooling operation is performed by operating the refrigeration cycle device 10.

In the control program executed in the air-battery cooling operation, the target blowing temperature TAO is calculated in the same manner as in the air cooling alone operation.

In the air-battery cooling operation, the controller 50 sets the first expansion valve 13 and the second expansion valve 15 to the throttle state where the pressure reducing action is exhibited, and also sets the outlet side expansion valve 18 to the throttle state where the pressure reducing action is exhibited.

Thus, as shown by the black arrow in FIG. 1, a vapor compression type refrigeration cycle is configured in which the refrigerant circulates in the order of the compressor 11, the radiator 12, the first expansion valve 13, the first evaporator 14, and the compressor 11, and the refrigerant circulates in the order of the compressor 11, the radiator 12, the second expansion valve 15, the second evaporator 16, the outlet side expansion valve 18, and the compressor 11.

In this cycle configuration, the controller 50 controls the compressor 11 and the first expansion valve 13 in the same manner as the air cooling alone operation. That is, the refrigerant discharge capacity of the compressor 11 is adjusted so that the first evaporator temperature TE is the target first evaporator temperature TEO. The throttle opening degree of the first expansion valve 13 is adjusted so that the degree of subcooling of the refrigerant flowing into the first expansion valve 13 is the target degree of subcooling.

The controller 50 adjusts the throttle opening degree of the outlet side expansion valve 18 so that a degree of superheat of the refrigerant that has flowed from the second evaporator 16 is a target degree of superheat. The controller 50 calculates the degree of superheat of the refrigerant that has flowed from the second evaporator 16 based on the pressure and the temperature of the outlet refrigerant of the second evaporator 16. The controller 50 may calculate the degree of superheat of the outlet refrigerant of the second evaporator 16 based on a temperature difference between the refrigerant flowing into the second evaporator 16 and the refrigerant that has flowed from the second evaporator 16.

The controller 50 determines the target degree of superheat based on the pressure of the refrigerant that has flowed from the second evaporator 16 and the temperature of the refrigerant that has flowed from the second evaporator 16 with reference to the control map stored in the controller 50 in advance. In the control map, the target degree of superheat is determined so that the coefficient of performance COP of the cycle approaches the maximum value.

Figure 4:
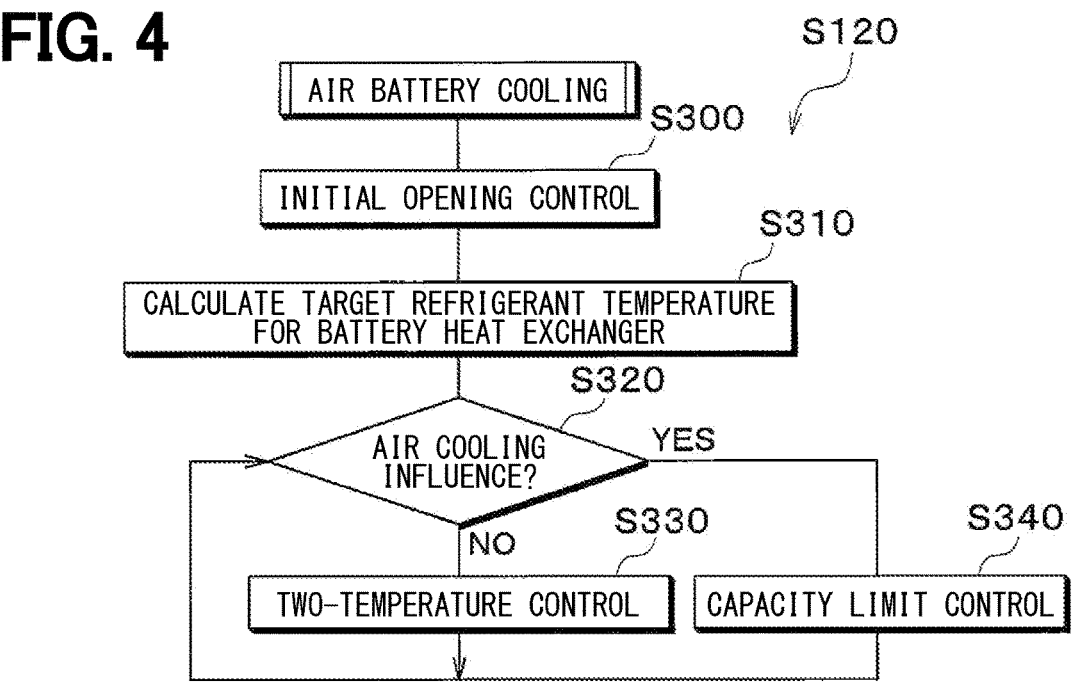
FIG. 4 is a flowchart showing a second control process executed by the controller of the refrigeration cycle device in the first embodiment.

In the air-battery cooling operation, the controller 50 executes a control program shown in the flowchart of FIG. 4 to control the second expansion valve 15.

In step S300, initial opening control of the second expansion valve 15 is performed. Specifically, in the initial opening control of the second expansion valve 15, the second expansion valve 15 is set to a predetermined initial opening degree. The predetermined initial opening degree is the opening degree of the second expansion valve 15 such that the influence on the air cooling is minimized. In other words, the predetermined initial opening degree is an opening degree smaller than the opening degree of the second expansion valve 15 when the influence on the air cooling is large.

Therefore, when the refrigerant flows to the second evaporator 16 by opening the second expansion valve 15, the refrigerant flowing to the first evaporator 14 can be restricted from greatly decreasing. Therefore, the heat exchange amount in the first evaporator 14 can be reduced and the temperature of the air cooled by the first evaporator 14 can be restricted from largely fluctuating.

In the initial opening control of the second expansion valve 15, the throttle opening degree of the second expansion valve 15 may be gradually increased at a predetermined valve opening speed. The valve opening speed is an increment of the throttle opening degree per unit time. The predetermined valve opening speed is the valve opening speed of the second expansion valve 15, at which the influence on the air cooling is minimized. In other words, the predetermined valve opening speed is a valve opening speed smaller than the valve opening speed of the second expansion valve 15 which has a great influence on air cooling.

Therefore, it is possible to restrict a large decrease in the refrigerant flowing to the first evaporator 14 when the refrigerant flows to the second evaporator 16 by opening the second expansion valve 15. Therefore, a decrease in the heat exchange amount in the first evaporator 14 and a large change in the temperature of the air cooled by the first evaporator 14 can be restricted.

In the following step S310, the target second evaporator temperature TinO is calculated by using the following Mathematical Expression F2.

$$TinO = TB - [Q1 \cdot CB \cdot (TBO - TB)/t]/KF \quad (F2)$$

In Mathematical Expression F2, Q1 is a heat generation amount of the battery 2. TBO is a cooling target temperature of the battery 2. TB is a temperature of the battery 2 detected by the battery temperature sensor 71. CB is a heat capacity of the battery 2. KF is a thermal conductance between the battery 2 and the refrigerant of the second evaporator 16. t is a time (hereinafter, referred to as the cooling time) taken for the temperature of the battery 2 to reach the cooling target temperature TBO.

The cooling time t may be a fixed value stored in advance in the controller 50. The controller 50 may calculate the cooling time tin accordance with the vehicle traveling condition or the like.

The heat generation amount Q1 of the battery 2 is calculated based on vehicle travel information from the vehicle control device 70. The heat generation amount Q1 of the battery 2 may be estimated from the temperature change in the battery 2. The heat generation amount Q1 of the battery 2 is preferably a time average value. This is because an instantaneous value of the heat generation amount Q1 of the battery 2 greatly varies.

The cooling target temperature TBO of the battery 2 is stored in the controller 50 in advance. The cooling target temperature TBO of the battery 2 may be determined in accordance with the vehicle traveling condition of the vehicle or the like.

The heat capacity CB of the battery 2 and the thermal conductance KF between the battery 2 and the refrigerant of the second evaporator 16 are stored in the controller 50 in advance.

Mathematical Expression F2 is derived as follows. A temperature change amount ΔTB when the battery 2 is cooled from a current temperature TB to the cooling target temperature TBO is expressed by the following Mathematical Expression F3.

$$\Delta TB = TBO - TB = (Q1 - Q2) \cdot t / CB \tag{F3}$$

Figure 5:
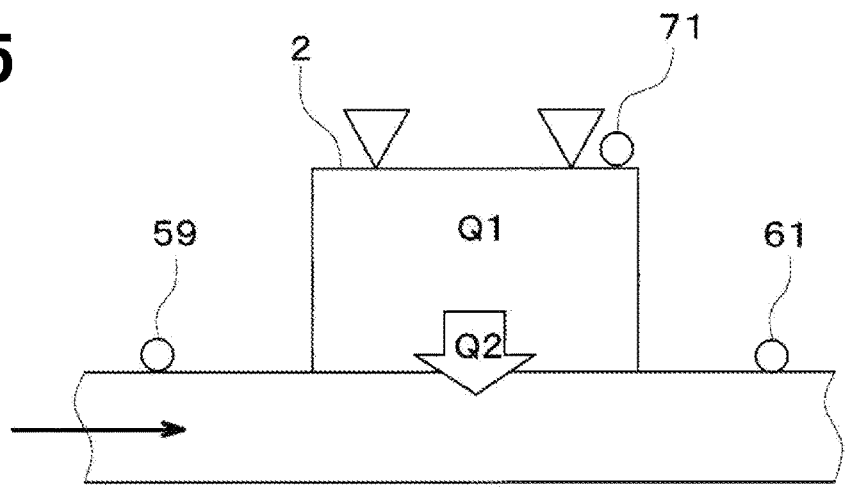
FIG. 5 is an explanatory view showing heat transfer between a battery and a second evaporator in the first embodiment.

In Mathematical Expression F3 and FIG. 5, Q2 represents a cooling amount of the battery 2 by the refrigerant of the second evaporator 16. In other words, Q2 in Mathematical Expression F3 and FIG. 5 is a heat transfer amount from the battery 2 to the refrigerant of the second evaporator 16.

Assuming that the temperature of the refrigerant of the second evaporator 16 is the target second evaporator temperature TinO, a cooling amount Q2 of the battery 2 by the refrigerant of the second evaporator 16 is expressed by the following Mathematical Expression F4.

$$Q2 = KF \cdot (TB - TinO) \tag{F4}$$

Accordingly, Mathematical Expression F2 is derived by substituting Mathematical Expression F4 into Mathematical Expression F3 and solving for the target second evaporator temperature TinO.

From Mathematical Expression F2, the temperature difference ΔT obtained by subtracting the target second evaporator temperature TinO from the current temperature TB of the battery 2 is expressed by the following Mathematical Expression F5.

$$\Delta T = TB - TinO = [Q1 - CB \cdot (TBO - TB)/t]/KF \tag{F5}$$

That is, the target second evaporator temperature TinO is determined so as to be a temperature lower than the current temperature TB of the battery 2 by a predetermined temperature difference ΔT.

As is clear from the Mathematical Expression F5, the predetermined temperature difference ΔT is determined so as to be a value that increases as the heat generation amount Q1 of the battery 2 is larger, and is determined so as to be a value that increases as the current temperature TB of the battery 2 is higher.

In the next step S320, it is determined whether there is an influence on the air cooling by the battery cooling. Specifically, it is determined whether the rotation speed of the compressor 11 exceeds a predetermined rotation speed, and whether a difference TE−TEO obtained by subtracting the target first evaporator temperature TEO from the first evaporator temperature TE exceeds an allowable temperature difference ΔTE.

Figure 6:
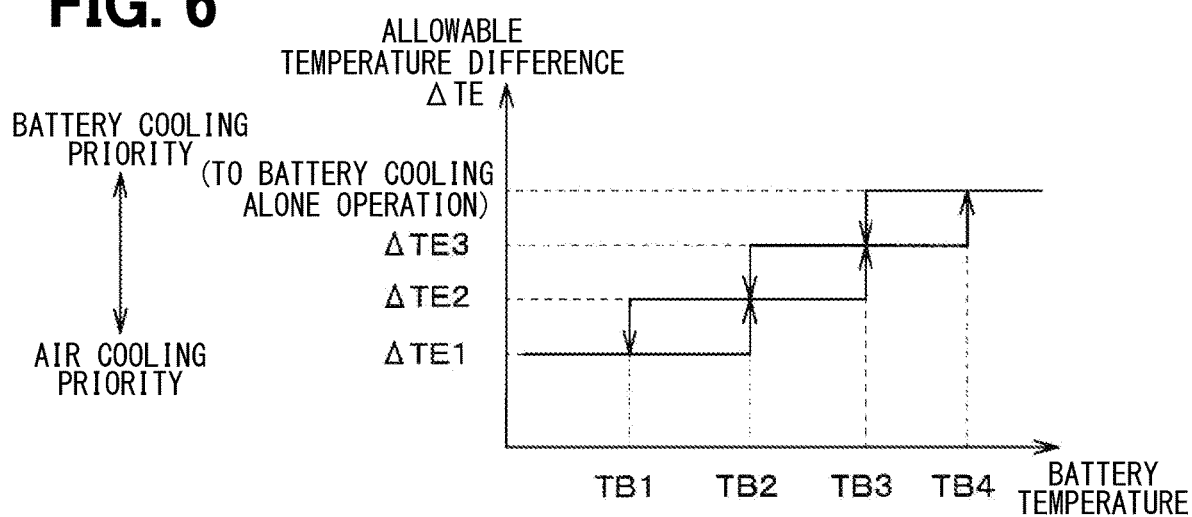
FIG. 6 is a diagram showing control characteristics which are used for calculating an allowable temperature difference in the second control process shown in FIG. 4.

As shown in FIG. 6, the allowable temperature difference ΔTE is calculated based on a level (in other words, the temperature of the battery 2) of the battery cooling request.

The higher the temperature of the battery 2, the higher the level of battery cooling requests is. The higher the level of the battery cooling request, the larger the allowable temperature difference ΔTE is determined to be. The higher the level of the battery cooling request, the larger the allowable temperature difference ΔTE is in a stepwise manner. In an emergency in which the temperature of the battery 2 is very high and the level of the battery cooling request is very high, the operation proceeds to the battery alone operation.

In FIG. 6, the battery temperatures TB1, TB2, TB3, and TB4 have a relationship of TB1<TB2<TB3<TB4. The battery temperature TB1 is a temperature close to a maximum temperature of an adjusted temperature range (for example, 10 to 40° C.) of the battery 2. For example, in a case where the adjusted temperature range of the battery 2 is 10 to 40° C., the battery temperature TB1 is about 40° C. The battery temperature TB4 is a temperature close to an upper limit temperature (for example, 50° C.) of the battery 2.

In a case where the temperature of the battery 2 rises to the upper limit temperature TB4, it is preferable to perform the battery cooling alone operation.

In FIG. 6, the allowable temperature differences ΔTE1, ΔTE2, and ΔTE3 have a relationship of ΔTE1<ΔTE2<ΔTE3. The allowable temperature difference ΔTE1 is, for example, 3° C. The allowable temperature difference ΔTE3 is, for example, 12° C.

In a case where it is determined in step S320 that there is no influence on the air cooling, the process proceeds to step S330, and two-temperature control is performed. Specifically, the refrigeration cycle device 10 is controlled based on mainly two temperatures, namely, the first evaporator temperature TE and the second evaporator temperature Tin.

The controller 50 controls the compressor 11 so that the first evaporator temperature TE is the target first evaporator temperature TEO. The controller 50 adjusts the throttle opening degree of the first expansion valve 13 so that the degree of subcooling of the refrigerant flowing into the first expansion valve 13 is the target degree of subcooling.

The throttle opening degree of the second expansion valve 15 is adjusted so that the second evaporator temperature Tin is the target second evaporator temperature TinO calculated in step S310. Specifically, as shown in the control map of FIG. 7, the amount of change of the opening degree of the second expansion valve 15 is determined so as to be proportional to the temperature difference TinO−Tin obtained by subtracting the current second evaporator temperature Tin from the target second evaporator temperature TinO. In a case where the temperature difference TinO−Tin obtained by subtracting the current second evaporator temperature Tin from the target second evaporator temperature TinO is 0, the amount of change of the opening degree of the second expansion valve 15 is set to 0.

As can be understood from Mathematical Expression F2, the target second evaporator temperature TinO is determined so as to be a lower temperature as the heat generation amount Q1 of the battery 2 increases, and is determined to be a lower temperature as the current temperature TB of the battery 2 increases. Therefore, the greater the heat generation amount Q1 of the battery 2, the smaller the throttle opening degree of the second expansion valve 15 is, and the higher the current temperature TB of the battery 2, the smaller the throttle opening degree of the second expansion valve 15 is.

Therefore, according to the two-temperature control, when the heat generation amount Q1 of the battery 2 is large or when the current temperature TB of the battery 2 is high, the second evaporator temperature Tin can be lowered to cool the battery 2 so as to approach the cooling target temperature TBO.

By controlling the second evaporator temperature Tin to be low, the temperature difference between the second evaporator temperature Tin and the temperature TB of the battery 2 is large. Therefore, the degree of superheat of the refrigerant evaporated in the second evaporator 16 is large. The throttle opening degree of the outlet side expansion valve 18 is adjusted so that the degree of superheat of the refrigerant that has flowed from the second evaporator 16 is the target degree of superheat.

On the other hand, in a case where it is determined in step S320 that there is an influence on the air cooling by the battery cooling, the process proceeds to step S340, and the capacity limit control is performed. In the capacity limit control, the refrigeration cycle device 10 is controlled based on at least the first evaporator temperature TE.

The controller 50 controls the compressor 11 so that the first evaporator temperature TE is the target first evaporator temperature TEO. The throttle opening degree of the first expansion valve 13 is adjusted so that the degree of subcooling of the refrigerant flowing into the first expansion valve 13 is the target degree of subcooling.

The throttle opening degree of the second expansion valve 15 is determined so as to be the amount of change of the opening degree of the smaller one of the battery cooling opening degree and the air cooling opening degree. Specifically, the amount of change in the throttle opening degree of the second expansion valve 15 is determined so as to be the amount of change in the opening degree of the smaller one of the amount of change in battery cooling opening degree and the amount of change in the air cooling opening degree.

The amount of change in the battery cooling opening degree is an amount of change in the opening of the second expansion valve 15 for setting the battery cooling capacity of the second evaporator 16 to the target battery cooling capacity. Specifically, as shown in the control map of FIG. 7, the amount of change in battery cooling opening degree is determined so as to be proportional to the temperature difference TinO–Tin obtained by subtracting the current second evaporator temperature Tin from the target second evaporator temperature TinO. In a case where the temperature difference TinO–Tin obtained by subtracting the current second evaporator temperature Tin from the target second evaporator temperature TinO is 0, the amount of change of the opening degree of the second expansion valve 15 is set to 0.

As can be understood from Mathematical Expression F2, the target second evaporator temperature TinO is determined so as to be a lower temperature as the heat generation amount Q1 of the battery 2 increases, and is determined to be a lower temperature as the current temperature TB of the battery 2 increases. Therefore, the greater the heat generation amount Q1 of the battery 2, the smaller the throttle opening degree of the second expansion valve 15 is, and the higher the current temperature TB of the battery 2, the smaller the throttle opening degree of the second expansion valve 15 is.

Therefore, according to the amount of change in battery cooling opening degree, when the heat generation amount Q1 of the battery 2 is large or when the current temperature TB of the battery 2 is high, the second evaporator temperature Tin can be lowered to cool the battery 2 so as to approach the cooling target temperature TBO.

Figure 8:
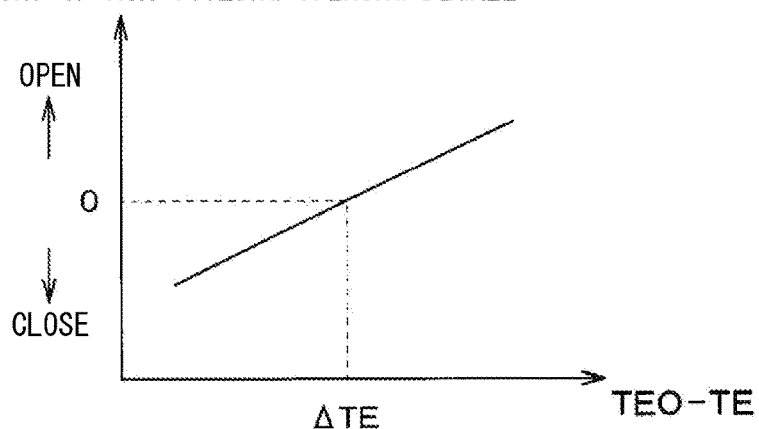
FIG. 8 is a diagram showing control characteristics which are used for calculating an amount of change in air cooling opening degree in the second control process shown in FIG. 4.

The amount of change in air cooling opening degree is an amount of change of the opening degree of the second expansion valve 15 for setting the air cooling capacity of the first evaporator 14 to the target air cooling capacity. Specifically, as shown in the control map of FIG. 8, the amount of change of the opening degree of the second expansion valve 15 is determined so as to be proportional to the temperature difference TEO–TE obtained by subtracting the current first evaporator temperature TE from the target first evaporator temperature TEO. In a case where the value of the temperature difference TEO–TE obtained by subtracting the current first evaporator temperature TE from the target first evaporator temperature TEO is the same as the allowable temperature difference ΔTE calculated in step S340, the amount of change of the opening degree of the second expansion valve 15 is set to 0.

According to the amount of change in air cooling opening degree, as the first evaporator temperature TE needs to be lowered, the refrigerant flow rate flowing into the second evaporator 16 can be reduced by reducing the throttle opening degree of the second expansion valve 15. Therefore, the refrigerant flow rate flowing into the first evaporator 14 can be increased to lower the first evaporator temperature TE.

In the capacity limit control, the throttle opening degree of the second expansion valve 15 is adjusted by selecting the amount of change of the opening degree of the smaller one of the amount of change in battery cooling opening degree and the amount of change in air cooling opening degree. Therefore, the first evaporator temperature TE can be restricted from exceeding the target first evaporator temperature TEO.

That is, in a case where amount of change in air cooling opening degree is selected in the capacity limit control, the cooling capacity of the first evaporator 14 is prioritized and the throttle opening degree of the second expansion valve 15 is reduced. Therefore, the refrigerant flow rate flowing into the second evaporator 16 is reduced and the cooling capacity of the battery 2 in the second evaporator 16 is limited. That is, the capacity limit control is limit control for restricting the cooling capacity of the battery 2.

Even during the capacity limit control in step S340, the throttle opening degree of the outlet side expansion valve 18 is adjusted so that the degree of superheat of the refrigerant that has flowed from the second evaporator 16 is the target degree of superheat.

In the present embodiment, the controller 50 performs the capacity limit control in a case where it is necessary to give priority to the cooling of the air in the first evaporator 14 over the cooling of the battery 2 in the second evaporator 16. In the capacity limit control, the second expansion valve 15 is controlled to the smaller one of the battery cooling opening degree and the air cooling opening degree.

The battery cooling opening degree is an opening degree for setting the battery cooling capacity of the second evaporator 16 to a target battery cooling capacity. The air cooling opening degree is an opening degree for setting the air cooling capacity of the first evaporator 14 to a target air cooling capacity.

According to this, since the pressure of the refrigerant flowing into the second evaporator 16 is lowered by reducing the opening degree of the second expansion valve 15, the temperature of the second evaporator 16 can be lowered.

On the other hand, since the refrigerant flow rate flowing into the second evaporator 16 is reduced by reducing the opening degree of the second expansion valve 15, the refrigerant flow rate flowing into the first evaporator 14 can be increased.

The second expansion valve 15 or the outlet side expansion valve 18 is controlled to the smaller one of the battery cooling opening degree and the air cooling opening degree. Therefore, an insufficient refrigerant flow rate flowing into the first evaporator 14 can be restricted while restricting an increase in the temperature of the second evaporator 16. As a result, both air cooling and battery cooling can be achieved while restricting an increase in power consumption.

In the present embodiment, the controller 50 controls the opening degree of the outlet side expansion valve 18 so that the degree of superheat of the refrigerant on the outlet side of the second evaporator 16 approaches the target degree of superheat. Therefore, the occurrence of dry-out in the second evaporator can be restricted. As a result, it is possible to achieve both air cooling, battery cooling, and restriction of battery temperature variation as much as possible while restricting an increase in power consumption.

In the present embodiment, in a case where it is determined that the cooling of the air in the first evaporator 14 is not influenced by the cooling of the battery 2 in the second evaporator 16, the controller 50 controls the opening degree of the second expansion valve 15 to an opening degree for setting the battery cooling capacity of the second evaporator 16 to the target battery cooling capacity. In a case where it is determined that the cooling of the air in the first evaporator 14 is influenced by the cooling of the battery 2 in the second evaporator 16, the controller 50 performs the capacity limit control.

In the present embodiment, in the capacity limit control, the controller 50 sets the battery cooling opening degree as the opening degree for setting the temperature of the second evaporator 16 to the target second evaporator temperature TinO, and sets the air cooling opening degree as the opening degree for setting the temperature of the first evaporator 14 to the target first evaporator temperature TEO. Thus, in the capacity limit control, the battery cooling opening degree and the air cooling opening degree can be appropriately determined.

In the present embodiment, in the capacity limit control, the controller 50 determines the target second evaporator temperature TinO such that the target second evaporator temperature TinO is lower than the temperature TB of the battery 2 by the predetermined temperature difference ΔT, and determines the predetermined temperature difference ΔT such that the value of the predetermined temperature difference ΔT increases as the heat generation amount Q1 of the battery 2 increases. Therefore, the target second evaporator temperature TinO can be appropriately determined.

Figure 7:
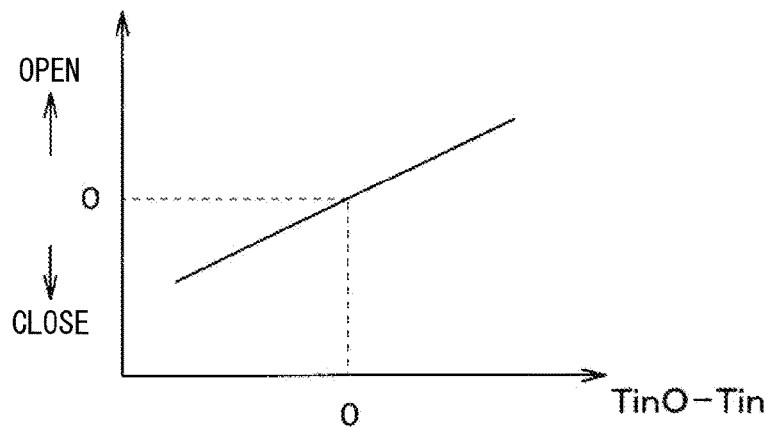
FIG. 7 is a diagram showing control characteristics which are used for calculating an amount of change in battery cooling opening degree in the second control process shown in FIG. 4.

In the present embodiment, as can be understood from Mathematical Expression F2 and FIG. 7, in the capacity limit control, the controller 50 increases the amount of reduction in the battery cooling opening degree as the temperature of the battery 2 increases. Therefore, the higher the temperature of the battery 2, the lower the pressure and temperature of the refrigerant flowing into the second evaporator 16 are, and the lower the temperature of the battery 2 can be.

In the present embodiment, the second evaporator 16 is disposed in contact with the battery 2 in a heat conductive manner. According to this configuration, the battery 2 can be satisfactorily cooled and deterioration of the battery 2 can be restricted by the operation and effect of the present embodiment described above.

That is, in the configuration in which the second evaporator 16 is disposed in contact with the battery 2 in a heat conductive manner, if the evaporation of the refrigerant in the second evaporator 16 is excessive, a region (hereinafter, referred to as a dry-out region) in which only the gas-phase refrigerant exists inside the second evaporator 16 occurs. In the dry-out region, the refrigerant can absorb only a sensible heat component, and cannot absorb a latent heat component of evaporation. Therefore, since a deviation occurs in the cooling depending on a portion of the battery 2, the temperature varies depending on a portion of the battery 2, and the deterioration of the battery 2 easily progresses.

Thus, in the present embodiment, the refrigerant can be appropriately evaporated by the second evaporator 16 by the above-described operation and effect. Therefore, the battery 2 can be satisfactorily cooled and deterioration of the battery 2 can be restricted.

Second Embodiment

In the embodiment described above, the second evaporator 16 is disposed in contact with the battery 2 in a heat conductive manner, and the refrigerant flowing inside the second evaporator 16 absorbs heat from the battery 2 without passing through another heat medium, thereby cooling the battery 2.

Figure 9:
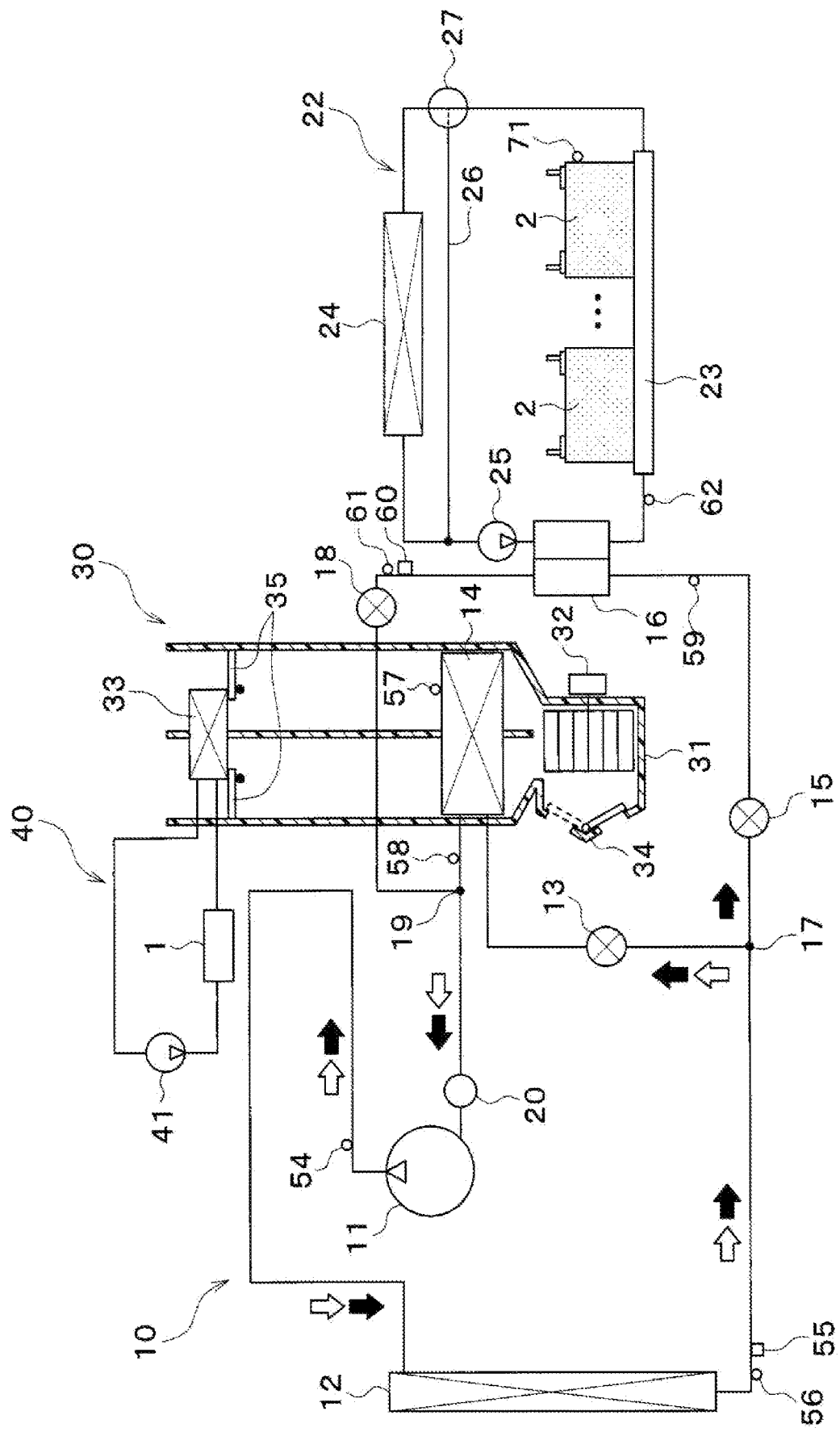
FIG. 9 is an overall configuration diagram showing a refrigeration cycle device according to a second embodiment.

In the present embodiment, as shown in FIG. 9, the refrigerant flowing inside the second evaporator 16 absorbs heat from the battery 2 via the heat medium of the low-temperature coolant circuit 22, thereby cooling the battery 2.

The refrigerant inlet side of the second evaporator 16 is connected to the outlet side of the second expansion valve 15. The second evaporator 16 is an evaporator that evaporates the low-pressure refrigerant by causing the low-pressure refrigerant that has flowed from the second expansion valve 15 to absorb heat from the coolant of the low-temperature coolant circuit 22. The other inflow port side of the second three-way joint 19 is connected to the refrigerant outlet side of the second evaporator 16.

The low-temperature coolant circuit 22 is a heat medium circuit in which the heat medium is circulated between the second evaporator 16 of the refrigeration cycle device 10, the battery heat exchanger 23, and the radiator 24. The coolant is used as the heat medium in the low-temperature coolant circuit 22. As the coolant, for example, water, an ethylene glycol aqueous solution, or the like can be employed.

In the low-temperature coolant circuit 22, a low-temperature coolant pump 25, a second evaporator 16, a battery heat exchanger 23, and a radiator 24 are disposed. In the low-temperature coolant circuit 22, these components are connected by a coolant flow channel. The low-temperature coolant circuit 22 constitutes a closed circuit in which the coolant is circulated.

The low-temperature coolant pump 25 is a water pump for sucking and pumping the coolant. The battery heat exchanger 23 is a heat exchanger that cools the battery 2 by causing the coolant of the low-temperature coolant circuit 22 to absorb heat from the battery 2. The radiator 24 is a heat exchanger for radiating heat from the coolant of the low-temperature coolant circuit 22 by exchanging heat between the coolant of the low-temperature coolant circuit 22 and the outside air. The radiator 24 is disposed on the front side in the vehicle engine hood. Outside air is blown to the radiator 24 by the outside air fan 12a.

The low-temperature coolant circuit 22 has a bypass flow channel 26 and a three-way valve 27. The bypass flow channel 26 is a coolant flow channel through which the coolant flows in parallel with the radiator 24. The three-way valve 27 is an electromagnetic valve for switching between a state where the coolant flows through the radiator 24 and does not flow through the bypass flow channel 26, and a state where the coolant does not flow through the radiator 24 and flows through the bypass flow channel 26. The operation of the three-way valve 27 is controlled by the controller 50.

A coolant temperature sensor 62 is connected to the input side of the controller 50. The coolant temperature sensor 62 is a coolant temperature detection unit that detects the temperature of the coolant flowing into the battery heat exchanger 23.

The controller 50 operates the low-temperature coolant pump 25 during the air-battery cooling operation. Therefore, the refrigerant flowing inside the second evaporator 16 absorbs heat from the heat medium of the low-temperature coolant circuit 22 to cool the heat medium, and the heat medium cooled by the second evaporator 16 absorbs heat from the battery 2 in the battery heat exchanger 23 to cool the battery 2.

Therefore, the same operation and effect as those of the above embodiment can be obtained.

Third Embodiment

Figure 10:
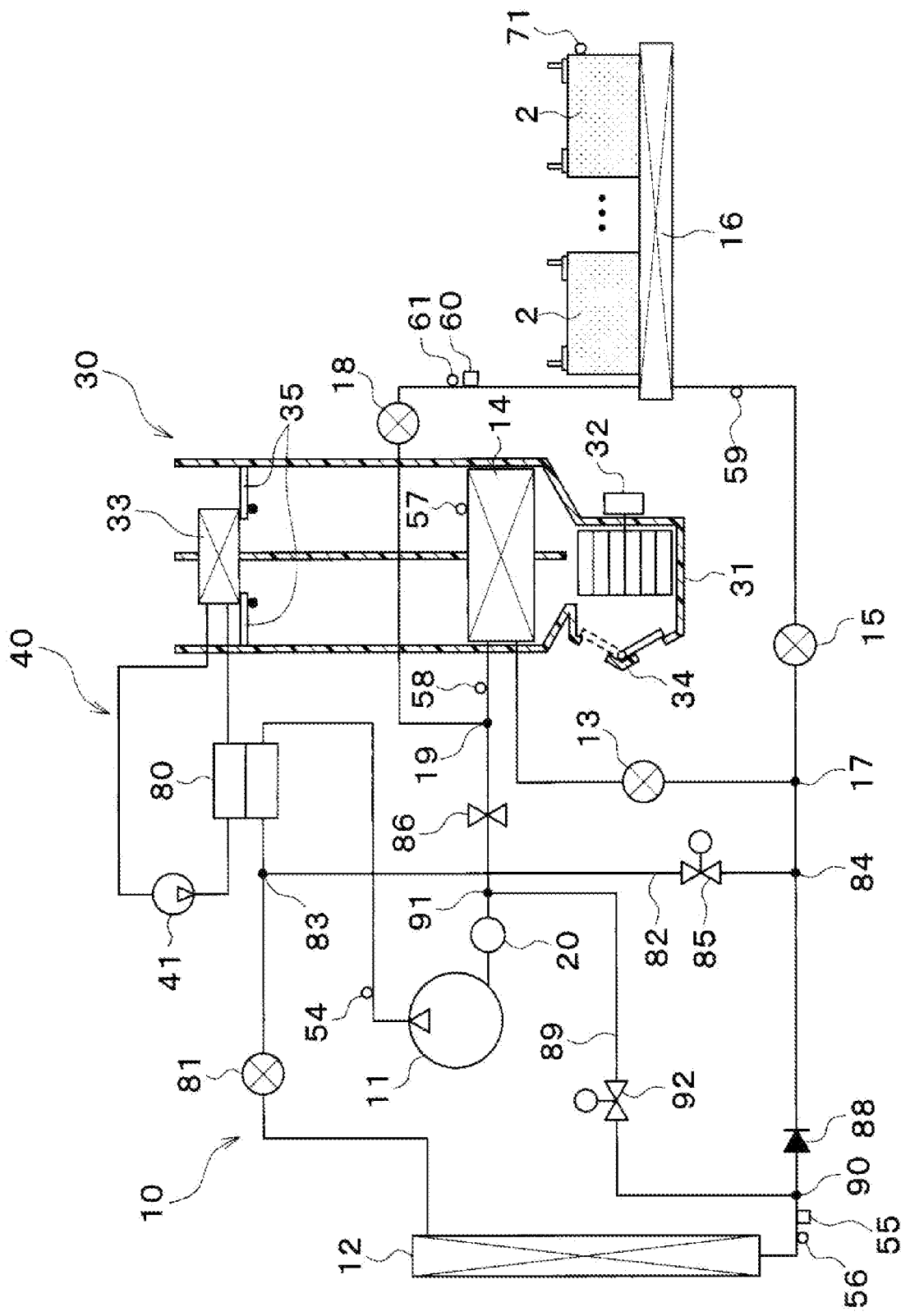
FIG. 10 is an overall configuration diagram showing a refrigeration cycle device according to a third embodiment.

In the first embodiment, the refrigeration cycle device 10 cools the air blown into the vehicle interior and the battery 2, but in the present embodiment, as shown in FIG. 10, the refrigeration cycle device 10 can cool and heat the air blown into the vehicle interior, and cool the battery 2.

Specifically, in the first embodiment, the coolant of the high-temperature coolant circuit 40 is heated by the waste heat of the engine 1, but in the present embodiment, the coolant of the high-temperature coolant circuit 40 is heated by an air heater 80.

The air heater 80 is disposed between the compressor 11 and the radiator 12 in the refrigerant flow of the refrigeration cycle device 10, and exchanges heat between the refrigerant discharged from the compressor 11 and the coolant of the high-temperature coolant circuit 40.

A heating expansion valve 81 is disposed between the air heater 80 and the radiator 12. The heating expansion valve 81 is a heating pressure reducing portion that reduces the pressure of the high-pressure refrigerant that has flowed from the radiator 12 during the heating operation. The heating expansion valve 81 is an electric variable throttle mechanism which is configured to include a valve body configured to be able to change the throttle opening degree and an electric actuator for changing the opening degree of the valve body. The heating expansion valve 81 adjusts the opening area of the flow channel through which the refrigerant flows to adjust the pressure reduction amount of the refrigerant.

One end of a bypass flow channel 82 is connected to the outlet side of the air heater 80 and the inlet side of the heating expansion valve 81 via a third three-way joint 83. The other end of the bypass flow channel 82 is connected to the outlet side of the radiator 12 and the inflow port side of the first three-way joint 17 via a fourth three-way joint 84.

The bypass flow channel 82 is a refrigerant flow channel for guiding the refrigerant that has flowed from the air heater 80 to the inflow port side of the first three-way joint 17 by bypassing the heating expansion valve 81 and the radiator 12.

A bypass open-close valve 85 is disposed in the bypass flow channel 82. The bypass open-close valve 85 is an electromagnetic valve that opens and closes the bypass flow channel 82, and is controlled to open and close by a control signal output from the controller 50.

An evaporation pressure regulation valve 86 is disposed on the outflow port side of the second three-way joint 19. The evaporation pressure regulation valve 86 is a pressure adjustment unit that maintains the pressure of the refrigerant on the outlet side of the first evaporator 14 and the outlet side of the second evaporator 16 at a predetermined reference pressure or higher in order to restrict frosting of the first evaporator 14 and the second evaporator 16.

The evaporation pressure regulation valve 86 is configured of a mechanical variable throttle mechanism that increases the valve opening degree as the pressure of the refrigerant on the outlet side of the first evaporator 14 rises. Therefore, the evaporation pressure regulation valve can maintain, as much as possible, the refrigerant evaporation temperature in the first evaporator 14 at a reference temperature or higher at which frosting of the first evaporator 14 can be restricted. The accumulator 20 is disposed on the outlet side of the evaporation pressure regulation valve 86 and on the intake port side of the compressor 11.

A check valve 88 is disposed on the outlet side of the radiator 12 and on the inflow port side of the fourth three-way joint 84. The check valve 88 allows the flow of the refrigerant from the outlet side of the radiator 12 to the inlet side of the fourth three-way joint 84, and prohibits the flow of the refrigerant from the inlet side of the fourth three-way joint 84 to the outlet side of the radiator 12. The check valve 88 can prevent a backward flow of the refrigerant that has merged from the bypass flow channel 82 to the fourth three-way joint 84, to the radiator 12 side.

One end of a heating flow channel 89 is connected to the outlet side of the radiator 12 and the inlet side of the check valve 88 via a fifth three-way joint 90. The other end of the heating flow channel 89 is connected to the outlet side of the evaporation pressure regulation valve 86 and the inlet side of the accumulator 20 via a sixth three-way joint 91.

The heating flow channel 89 is a refrigerant flow channel for guiding the refrigerant that has flowed from the radiator 12 to the inlet side of the accumulator 20 by bypassing the first expansion valve 13 and the first evaporator 14.

A heating open-close valve 92 is disposed in the heating flow channel 89. The heating open-close valve 92 is an electromagnetic valve that opens and closes the heating flow channel 89, and is controlled to open and close by a control signal output from the controller 50.

When the heating expansion valve 81 is fully opened, and the bypass open-close valve 85 and the heating open-close valve 92 are closed, the refrigerant does not flow through the bypass flow channel 82 and the heating flow channel 89. Therefore, the air cooling operation and the battery cooling operation can be performed in the same manner as those in the above embodiment.

By setting the heating expansion valve 81 to a predetermined throttle opening degree, closing the bypass open-close valve 85 and the heating open-close valve 92, and opening the first expansion valve 13 to a predetermined throttle opening degree, a refrigerant circuit in which refrigerant flows is formed as follows. That is, the refrigerant circuit is formed in which the refrigerant flows in the order of the compressor 11, the air heater 80, the heating expansion valve 81, the radiator 12, the first expansion valve 13, the first evaporator 14, the evaporation pressure regulation valve 86, the accumulator 20, and the compressor 11.

Therefore, the refrigerant absorbs heat in the radiator 12 and the first evaporator 14, and heat of the refrigerant dissipates in the air heater 80. Therefore, the first dehumidifying heating operation can be performed in which the air blown into the vehicle interior is heated by the heater core 33 after being cooled and dehumidified by the first evaporator 14.

In the first dehumidifying heating operation, the second expansion valve 15 is opened at a predetermined throttle opening degree, whereby the battery 2 can be cooled.

By setting the heating expansion valve 81 to a predetermined throttle opening degree, opening the bypass open-close valve 85, closing the heating open-close valve 92, and opening the first expansion valve 13 to a predetermined throttle opening degree, a refrigerant circuit in which refrigerant flows is formed as follows. That is, the refrigerant circuit is formed in which the refrigerant flows in the order of the compressor 11, the air heater 80, the heating expansion valve 81, the radiator 12, the accumulator 20, and the compressor 11, and the refrigerant circuit is formed in which the refrigerant flows in the order of the compressor 11, the air heater 80, the first expansion valve 13, the first evaporator 14, the evaporation pressure regulation valve 86, the accumulator 20, and the compressor 11.

Therefore, the heat is absorbed by the radiator 12 and the first evaporator 14, and the heat is dissipated by the air heater 80. Therefore, the second dehumidifying heating operation can be performed in which the air blown into the vehicle interior is heated by the heater core 33 after being cooled and dehumidified by the first evaporator 14.

In the second dehumidifying heating operation, the temperature of the refrigerant flowing into the radiator 12 can be lowered as compared with that in the first dehumidifying heating operation. Therefore, the amount of heat absorbed from the outside air can be increased to enhance the heating capacity.

In the second dehumidifying heating operation, the second expansion valve 15 is opened at a predetermined throttle opening degree, whereby the battery 2 can also be cooled.

By setting the heating expansion valve 81 to a predetermined throttle opening degree, closing the bypass open-close valve 85, opening the heating open-close valve 92, and closing the first expansion valve 13, a refrigerant circuit is formed in which the refrigerant flows in the order of the compressor 11, the air heater 80, the heating expansion valve 81, the radiator 12, the accumulator 20, and the compressor 11.

Therefore, since the heat is absorbed by the radiator 12 and dissipated by the air heater 80, it is possible to perform the heating operation in which the heater core 33 heats the air blown into the vehicle interior without cooling and dehumidifying the air by the first evaporator 14.

In the heating operation, by opening the second expansion valve 15 at a predetermined throttle opening degree, the battery 2 can also be cooled.

By fully opening the heating expansion valve 81, closing the bypass open-close valve 85, the heating open-close valve 92, and the first expansion valve 13, and opening the second expansion valve 15 at a predetermined throttle opening degree, a refrigerant circuit in which refrigerant flows is formed as follows. That is, the refrigerant circuit is formed in which the refrigerant flows in the order of the compressor 11, the air heater 80, the heating expansion valve 81, the radiator 12, the second expansion valve 15, the second evaporator 16, the outlet side expansion valve 18, the evaporation pressure regulation valve 86, the accumulator 20, and the compressor 11.

Therefore, the heat is absorbed by the second evaporator 16 and dissipated by the radiator 12, so that the battery 2 can be cooled.

According to the present embodiment, even in a vehicle that does not have an engine, such as an electric vehicle, cooling and heating of the vehicle interior and cooling of the battery 2 can be performed.

The air heater 80 exchanges heat between the refrigerant discharged from the compressor 11 and the coolant of the high-temperature coolant circuit 40 but the present invention is not limited thereto. The air heater 80 may be accommodated in the air conditioning case 31 instead of the heater core 33, and exchanges heat between the refrigerant discharged from the compressor 11 and the air passing through the first evaporator 14 to heat the air passing through the first evaporator 14.

Fourth Embodiment

Figure 11:
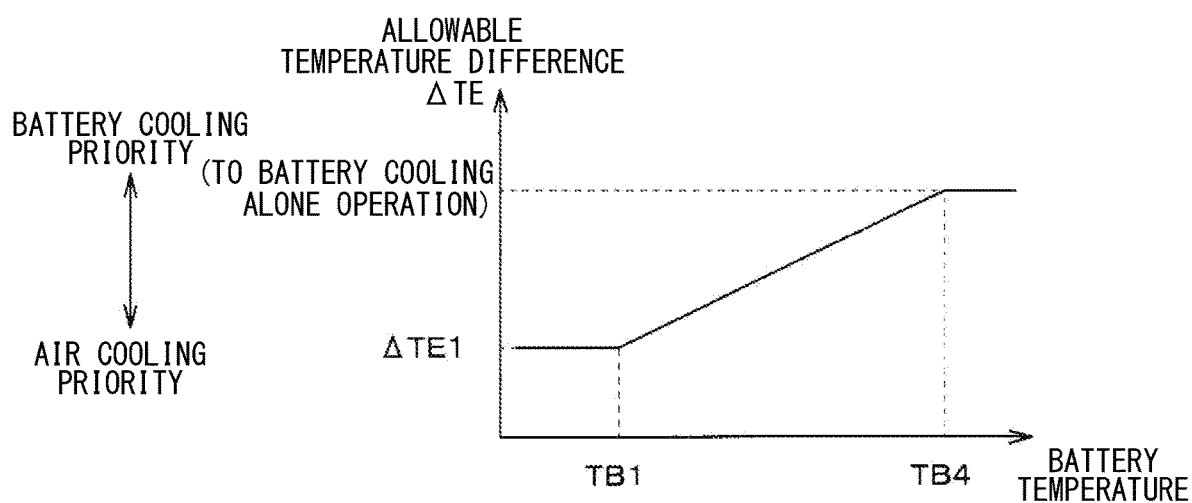
FIG. 11 is a diagram showing control characteristics which are used for calculating an allowable temperature difference in a control process executed by a controller of a refrigeration cycle device according to a fourth embodiment.

In the above embodiment, the higher the level of the battery cooling request, the larger the allowable temperature difference $\Delta TE$ is in a stepwise manner, but in the present embodiment, as shown in FIG. 11, the higher the level of the battery cooling request, the larger the allowable temperature difference $\Delta TE$ is continuously (linearly in the example of FIG. 11).

According to the present embodiment, since the allowable temperature difference $\Delta TE$ can be finely changed in accordance with the temperature of the battery 2, it is possible to more appropriately switch between the degree of superheat control and the capacity limit control.

The present disclosure is not limited to the embodiments described above, and various modifications can be made as follows within a range not departing from the spirit of the present disclosure.

In the above embodiments, an example in which R1234yf is employed as the refrigerant has been described, but the refrigerant is not limited to this. For example, R134a, R600a, R410A, R404A, R32, R407C, or the like may be employed. A mixture refrigerant or the like in which multiple types of these refrigerants are mixed may be employed.

Carbon dioxide may be employed as the refrigerant to constitute a supercritical refrigeration cycle in which the high-pressure side refrigerant pressure is equal to or higher than the critical pressure of the refrigerant.

In the above embodiments, the vehicle refrigeration cycle device 10 includes the accumulator 20, but the vehicle refrigeration cycle device 10 may include a receiver instead of the accumulator 20. The receiver is a refrigerant storage unit that stores excess refrigerant of the refrigerant condensed by radiating heat in the radiator 12.

When the vehicle refrigeration cycle device 10 includes a receiver, the controller 50 adjusts the throttle opening degree of the first expansion valve 13. Therefore, the degree of superheat of the refrigerant that has flowed from the first evaporator 14 is the target degree of superheat. The target degree of superheat is determined based on the pressure of the refrigerant that has flowed from the first evaporator 14 and the temperature of the refrigerant that has flowed from the first evaporator 14 with reference to a control map stored in advance in the controller 50. In the control map, the target degree of superheat is determined so that the coefficient of performance COP of the cycle approaches the maximum value.

When the vehicle refrigeration cycle device 10 includes a receiver, the first expansion valve 13 may be a thermal expansion valve.

In the capacity limit control of the above embodiments, the throttle opening degree of the second expansion valve 15 is adjusted based on the first evaporator temperature TE and the second evaporator temperature Tin, and the throttle opening degree of the outlet side expansion valve 18 is adjusted. Therefore, the degree of superheat of the refrigerant that has flowed from the second evaporator 16 is the target degree of superheat, but the present invention is not limited thereto.

The throttle opening degree of the second expansion valve 15 may be adjusted so that the degree of superheat of the refrigerant that has flowed from the second evaporator 16 is the target degree of superheat, and the throttle opening degree of the outlet side expansion valve 18 may be adjusted based on the first evaporator temperature TE and the second evaporator temperature Tin.

In the two-temperature control of the above embodiment, the throttle opening degree of the second expansion valve 15 is adjusted so that the second evaporator temperature Tin is the target second evaporator temperature TinO. The throttle opening degree of the outlet side expansion valve 18 is adjusted so that the degree of superheat of the refrigerant that has flowed from the second evaporator 16 is the target degree of superheat. As a modification, the throttle opening degree of the second expansion valve 15 may be adjusted so that the degree of superheat of the refrigerant that has flowed from the second evaporator 16 is the target degree of superheat. The throttle opening degree of the outlet side expansion valve 18 may be adjusted so that the second evaporator temperature Tin is the target second evaporator temperature TinO.

In the capacity limit control of the above embodiments, the throttle opening degree of the second expansion valve 15 is adjusted based on the first evaporator temperature TE and the second evaporator temperature Tin, but the present invention is not limited thereto. For example, the throttle opening degree of the second expansion valve 15 may be determined based on the refrigerant flow rate in the first evaporator 14 and the refrigerant flow rate in the second evaporator 16.

Although the disclosure has been described in accordance with the examples, it is understood that the present disclosure is not limited to such examples or structures. The present disclosure encompasses various modifications and variations within the scope of equivalents. In addition, various combinations and configurations, as well as other combinations and configurations that include only one element, more, or less, are within the scope and spirit of the present disclosure.

What is claimed is:

1. A refrigeration cycle device comprising:
    a compressor configured to draw and discharge a refrigerant;
    a radiator configured to dissipate heat from the refrigerant discharged from the compressor;
    a first pressure reducing valve configured to reduce a pressure of the refrigerant flowing from the radiator;
    a first evaporator configured to exchange heat between the refrigerant decompressed in the first pressure reducing valve and air, and to evaporate the refrigerant;
    a second pressure reducing valve disposed in parallel with the first pressure reducing valve in a flow of the refrigerant and configured to reduce the pressure of the refrigerant flowing from the radiator;
    a second evaporator configured to evaporate the refrigerant pressure-reduced in the second pressure reducing valve, by absorbing heat from a battery;
    a third pressure reducing valve configured to reduce the pressure of the refrigerant evaporated in the second evaporator; and
    a controller configured to control opening degrees of the second pressure reducing valve and the third pressure reducing valve, wherein
    the controller is configured to perform a limit control in which an opening degree of the second pressure reducing valve or the third pressure reducing valve is set at a smaller one of a battery cooling opening degree and an air cooling opening degree, the battery cooling opening degree being an opening degree for setting a battery cooling capacity of the second evaporator to a target battery cooling capacity, and the air cooling opening degree being an opening degree for setting an air cooling capacity of the first evaporator to a target air cooling capacity, and
    in the limit control, the controller controls the opening degree of the second pressure reducing valve to the smaller one of the air cooling opening degree and the battery cooling opening degree, and controls the opening degree of the third pressure reducing valve such that a degree of superheat of the refrigerant on an outlet side of the second evaporator approaches a target degree of superheat.

2. The refrigeration cycle device according to claim 1, wherein
    the controller is configured,
    to control the opening degree of the second pressure reducing valve or the third pressure reducing valve at an opening degree for setting the battery cooling capacity of the second evaporator to the target battery cooling capacity when determining that cooling of the battery in the second evaporator does not influence cooling of the air in the first evaporator, and
    to perform the limit control when determining that the cooling of the battery in the second evaporator influences the cooling of the air in the first evaporator.

3. The refrigeration cycle device according to claim 1, wherein,
    the controller is configured in the limit control,
    to set the air cooling opening degree to an opening degree for setting a temperature of the first evaporator to a target first evaporator temperature, and
    to set the battery cooling opening degree to an opening degree for setting a temperature of the second evaporator to a target second evaporator temperature.

4. The refrigeration cycle device according to claim 3, wherein,
    the controller is configured in the limit control,
    to determine the target second evaporator temperature to be lower than a temperature of the battery by a predetermined temperature difference, and
    to increase the predetermined temperature difference as a heat generation amount of the battery increases.

5. The refrigeration cycle device according to claim 1, wherein
    in the limit control, the controller increases an amount of reduction in the battery cooling opening degree as a temperature of the battery increases.

6. The refrigeration cycle device according to claim 1, wherein the second evaporator is disposed in contact with the battery to be thermally conductive.

7. A refrigeration cycle device comprising:
    a compressor configured to draw and discharge a refrigerant;
    a radiator configured to dissipate heat from the refrigerant discharged from the compressor;
    a first pressure reducing valve configured to reduce a pressure of the refrigerant flowing from the radiator;
    a first evaporator configured to exchange heat between the refrigerant decompressed in the first pressure reducing valve and air, and to evaporate the refrigerant;
    a second pressure reducing valve disposed in parallel with the first pressure reducing valve in a flow of the refrigerant and configured to reduce the pressure of the refrigerant flowing from the radiator;
    a second evaporator configured to evaporate the refrigerant pressure-reduced in the second pressure reducing valve, by absorbing heat from a battery;

a third pressure reducing valve configured to reduce the pressure of the refrigerant evaporated in the second evaporator; and a controller configured to control opening degrees of the second pressure reducing valve and the third pressure reducing valve, wherein the controller is configured to perform a limit control in which an opening degree of the second pressure reducing valve or the third pressure reducing valve is set at a smaller one of a battery cooling opening degree and an air cooling opening degree, the battery cooling opening degree being an opening degree for setting a battery cooling capacity of the second evaporator to a target battery cooling capacity, and the air cooling opening degree being an opening degree for setting an air cooling capacity of the first evaporator to a target air cooling capacity, and the controller is configured,
- to control the opening degree of the second pressure reducing valve or the third pressure reducing valve at an opening degree for setting the battery cooling capacity of the second evaporator to the target battery cooling capacity when determining that cooling of the battery in the second evaporator does not influence cooling of the air in the first evaporator, and
- to perform the limit control when determining that the cooling of the battery in the second evaporator influences the cooling of the air in the first evaporator.

8. A refrigeration cycle device comprising:

a compressor configured to draw and discharge a refrigerant;

a radiator configured to dissipate heat from the refrigerant discharged from the compressor;

a first pressure reducing valve configured to reduce a pressure of the refrigerant flowing from the radiator;

a first evaporator configured to exchange heat between the refrigerant decompressed in the first pressure reducing valve and air, and to evaporate the refrigerant;

a second pressure reducing valve disposed in parallel with the first pressure reducing valve in a flow of the refrigerant and configured to reduce the pressure of the refrigerant flowing from the radiator;

a second evaporator configured to evaporate the refrigerant pressure-reduced in the second pressure reducing valve, by absorbing heat from a battery;

a third pressure reducing valve configured to reduce the pressure of the refrigerant evaporated in the second evaporator; and a controller configured to control opening degrees of the second pressure reducing valve and the third pressure reducing valve, wherein the controller is configured to perform a limit control in which an opening degree of the second pressure reducing valve or the third pressure reducing valve is set at a smaller one of a battery cooling opening degree and an air cooling opening degree, the battery cooling opening degree being an opening degree for setting a battery cooling capacity of the second evaporator to a target battery cooling capacity, and the air cooling opening degree being an opening degree for setting an air cooling capacity of the first evaporator to a target air cooling capacity, and the controller is configured in the limit control,
- to set the air cooling opening degree to an opening degree for setting a temperature of the first evaporator to a target first evaporator temperature,
- to set the battery cooling opening degree to an opening degree for setting a temperature of the second evaporator to a target second evaporator temperature,
- to determine the target second evaporator temperature to be lower than a temperature of the battery by a predetermined temperature difference, and
- to increase the predetermined temperature difference as a heat generation amount of the battery increases.

9. The refrigeration cycle device according to claim 8, wherein in the limit control, the controller increases an amount of reduction in the battery cooling opening degree as a temperature of the battery increases.

10. The refrigeration cycle device according to claim 8, wherein the second evaporator is disposed in contact with the battery to be thermally conductive.

* * * * *